US012524315B2

(12) United States Patent
Srivastava et al.

(10) Patent No.: US 12,524,315 B2
(45) Date of Patent: Jan. 13, 2026

(54) BACKUP MANAGEMENT OF NON-RELATIONAL DATABASES

(71) Applicant: Rubrik, Inc., Palo Alto, CA (US)

(72) Inventors: Abhishek Srivastava, Bangalore (IN); Bittu Kumar, Bangalore (IN); Deepak Verma, Bangalore (IN); Rahul Thapliyal, Bangalore (IN)

(73) Assignee: Rubrik, Inc., Palo Alto, CA (US)

( * ) Notice: Subject to any disclaimer, the term of this patent is extended or adjusted under 35 U.S.C. 154(b) by 18 days.

(21) Appl. No.: 18/593,612

(22) Filed: Mar. 1, 2024

(65) Prior Publication Data

US 2025/0278340 A1 Sep. 4, 2025

(51) Int. Cl.
*G06F 11/14* (2006.01)

(52) U.S. Cl.
CPC ...... *G06F 11/1466* (2013.01); *G06F 11/1464* (2013.01); *G06F 11/1471* (2013.01); *G06F 2201/80* (2013.01); *G06F 2201/84* (2013.01)

(58) Field of Classification Search
CPC ............ G06F 11/1466; G06F 11/1464; G06F 11/1471; G06F 2201/80; G06F 2201/84
USPC ........................................................ 711/162
See application file for complete search history.

(56) References Cited

U.S. PATENT DOCUMENTS

| 2012/0124306 A1* | 5/2012 | Abercrombie ...... G06F 11/1451 711/E12.103 |
| 2012/0226664 A1* | 9/2012 | Habermann ........ G06F 11/1469 707/E17.005 |
| 2017/0075627 A1* | 3/2017 | Pradeep ................ G06F 3/0643 |
| 2019/0171532 A1* | 6/2019 | Abadi ................. H04L 67/1095 |
| 2020/0233876 A1* | 7/2020 | Gvili ....................... G06F 3/065 |
| 2021/0373893 A1* | 12/2021 | Thomsen .............. G06F 16/254 |

* cited by examiner

*Primary Examiner* — Jared I Rutz
*Assistant Examiner* — Wei Ma
(74) *Attorney, Agent, or Firm* — Holland & Hart LLP

(57) ABSTRACT

Methods, systems, and devices for data management are described. For example, techniques for scalable backup solutions for non-relational databases are described. A data management system (DMS) may use different buffer pools for the extraction of data from the non-relational database and the movement (e.g., copying or transferring of data) from the buffers to a remote storage location. A backup process for a collection may involve one or more iterations involving retrieving or selecting a buffer from an empty buffer queue of an agent of the DMS at the non-relational database, filling the buffer with data from the non-relational database to the retrieved buffer, moving the filled buffer to a full buffer queue, moving the data to a remote storage location, and moving the buffer back to the empty buffer queue after moving the data on the buffer to the remote storage location.

20 Claims, 12 Drawing Sheets

US 12,524,315 B2

BACKUP MANAGEMENT OF NON-RELATIONAL DATABASES

FIELD OF TECHNOLOGY

The present disclosure relates generally to data management, including techniques for backup management of non-relational databases.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
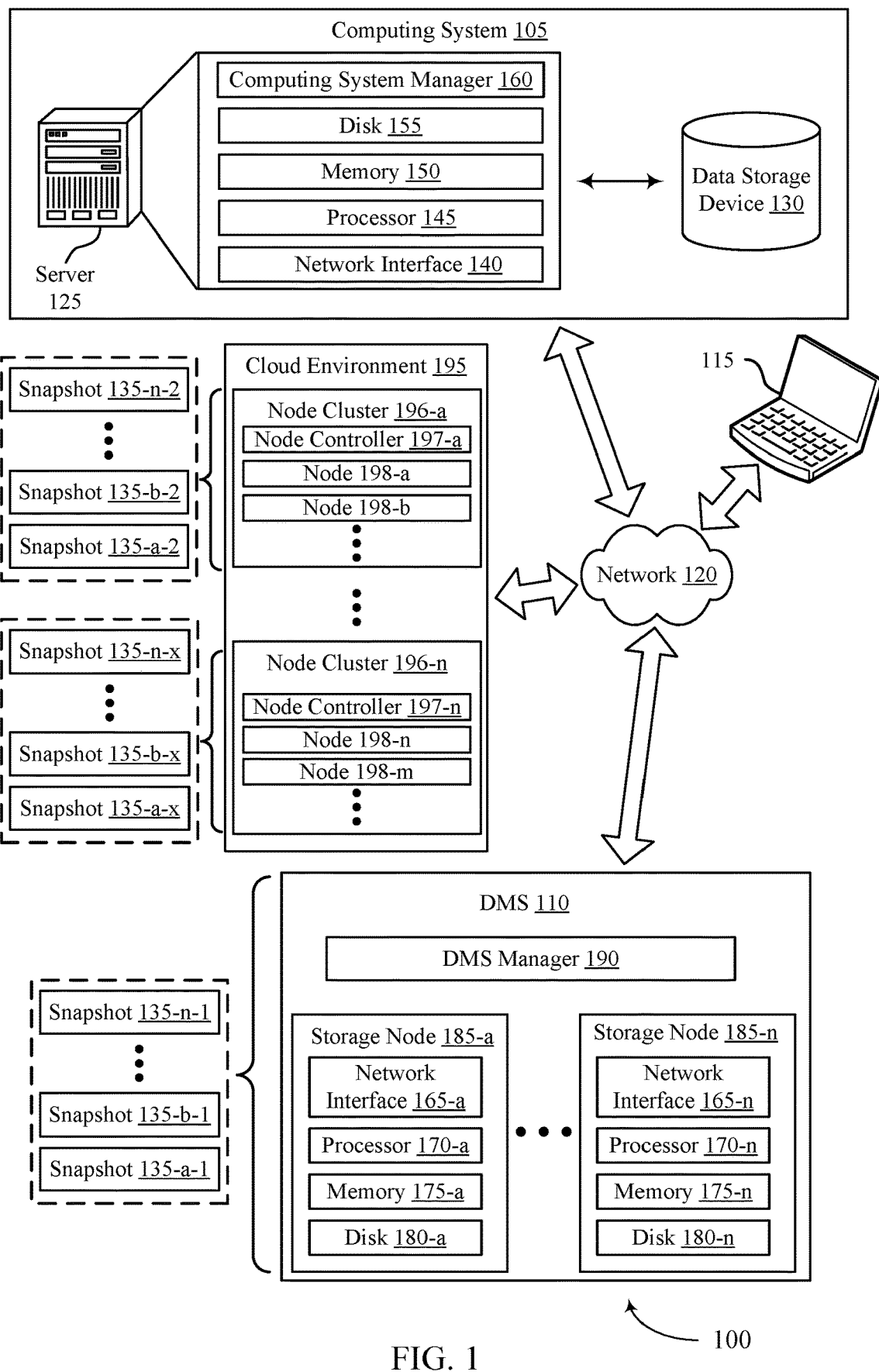
FIG. 1 illustrates an example of a computing environment that supports backup management of non-relational databases in accordance with aspects of the present disclosure.

A data management system (DMS) may include various nodes, clusters, and sub-systems that provide backup and recovery services for customer computing systems or databases. Backup processes may involve capturing snapshots of customer computing systems or databases and storing the snapshots at a storage environment accessible to the DMS. In some cases, the DMS may provide backup and/or recovery services for a non-relational database. For example, a non-relational database may not use a tabular schema of rows and columns and/or may be referred to as a non-SQL or noSQL database. For example, a Mongo database may be a non-relational database. In some examples, a non-relational database may be a document-oriented database that utilizes JSON-like documents and may include multiple (e.g., thousands of) collections of documents. A non-relational database may be stored at multiple hosts (e.g., a primary host and one or more secondary hosts) which each store a full copy of the data in the database. For example, changes at the primary host may periodically be updated to be reflected at the secondary hosts. Operation logs (oplogs or log snapshots) may capture changes that occur at a given collection at a primary host which may then be replicated to the secondary hosts. Given that a non-relational database may have thousands of collections, per-collection backups may not be scalable for customers of a DMS (e.g., may involve undesirable latencies, among other potential drawbacks).

Aspects of this disclosure relate to techniques for scalable backup for non-relational databases. To streamline the movement of data from a non-relational database to a remote storage environment as part of the backup process for the non-relational database, the DMS may use different buffer pools for the extraction of data from the non-relational database and the movement (e.g., copying or transferring of data) from the buffers to the remote storage location. For example, a backup process for a collection may involve one or more iterations involving retrieving or selecting a buffer from an empty buffer queue of an agent of the DMS at the non-relational database, filling the buffer with data from the non-relational database to the retrieved buffer, moving the filled buffer to a full buffer queue, moving (e.g., copying) the data to a remote storage location, and moving the buffer back to the empty buffer queue after moving the data on the buffer to the remote storage location. In some examples, the agent may initiate an extractor job or thread (e.g., an extractor job) and a mover job or thread (e.g., a mover job). The extractor job may extract data from the non-relational database and write the data to an empty buffer. The mover job may move data from a buffer in the full buffer queue to the remote storage location. The backup process may be performed iteratively for a collection until all of the data (or the changed or new data for an incremental snapshot) is backed up at the remote storage location. For example, a buffer may be reused once the buffer is moved back to the empty buffer queue. Accordingly, the extraction process and movement process may not block each other. Backup processes may be performed on multiple collections, for example, in parallel, to increase throughput and reduce latency.

Additionally, or alternatively, the DMS may extract data from the multiple hosts (e.g., the primary host and the one or more secondary hosts or just from two or more secondary hosts) in parallel to reduce the latency associated with a backup of a non-relational database. For example, given 30 collections in a non-relational database to be backed up, the DMS may extract data from 10 of the collections from the primary host, data from 10 other of the collections from a first secondary host, and data from 10 other of the collections from a second secondary host. The DMS may use techniques such as the insertion of special marker documents into the primary host, which will then be replicated into the secondary hosts, to determine whether the secondary hosts are synchronized with the primary host prior to initiating a parallel backup of the Mongo database. Additionally, or alternatively, the DMS may use the oplogs generated by the non-relational database to capture additional changes to a non-relational database after the initiation of the backup of the non-relational database. For example, the additional changes captured by the oplogs may be applied by the DMS on top of a full backup of the non-relational database to generate a consistent snapshot (e.g., all aspects of the snapshot correspond to a single point-in-time and are thus consistent with one another).

FIG. 1 illustrates an example of a computing environment 100 that supports backup management of non-relational databases in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state--which may be referred to as the delta-of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-a may be associated with the first customer or tenant associated with the computing system 105. The DMS 110 may obtain (e.g., generate or receive) and transfer the snapshots 135 associated with the computing system 105 to the node cluster 196-a in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-n in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

The DMS 110 may provide backup and recovery services for a non-relational database (e.g., the computing system 105) may be a non-relational database and the DMS 110 may capture snapshots 135 of the non-relational database. The non-relational database may be stored at multiple hosts (e.g., a primary host and one or more secondary hosts) which each store a full copy of the data in the database. For example, different hosts may be different servers, different virtual machines, or different storage nodes. Data in the non-relational database may be organized as collections of documents (e.g., JSON-like documents). As the non-relational database may have thousands of collections, the DMS 110 may implement techniques for scalable backup of the non-relational database.

For example, to streamline the movement of data from the non-relational database to a remote storage environment (e.g., one or more storage nodes 185 at the DMS 110 or one or more node clusters 196 at the cloud environment 195) as part of the backup process for the non-relational database, the DMS 110 may use different buffer pools for the extraction of data from the non-relational database and the movement (e.g., copying or transferring of data) from the buffers to the remote storage location. For example, a backup process for a collection may involve one or more iterations involving retrieving or selecting a buffer from an empty buffer queue of an agent of the DMS 110 at the non-relational database, filling the buffer with data from the non-relational database to the retrieved buffer, moving the filled buffer to a full buffer queue, moving (e.g., copying) the data to a remote storage location, and moving the buffer back to the empty buffer queue after moving the data on the buffer to the remote storage location. In some examples, the agent may initiate an extractor job and a mover job. The extractor job may extract data from the non-relational database and write the data to an empty buffer. The mover job may move data from a buffer in the full buffer queue to the remote storage location. The backup process may be performed iteratively for a collection until all of the data (or the modified or new data for an incremental snapshot) is backed up at the remote storage location. For example, a buffer may be reused once the buffer is moved back to the empty buffer queue. Accordingly, the extraction process and movement process may not block each other. Backup processes may be performed on multiple collections, for example, in parallel, to increase throughput and reduce latency.

Additionally, or alternatively, the DMS 110 may extract data from the multiple hosts (e.g., the primary host and the one or more secondary hosts) in parallel to reduce the latency associated with a backup of a non-relational database. For example, given 30 collections in a non-relational database to be backed up, the DMS 110 may extract data from 10 of the collections from the primary host, data from 10 other of the collections from a first secondary host, and data from 10 other of the collections from a second secondary host. The DMS 110 may use techniques such as the insertion of special marker documents into the primary host, which will then be replicated into the secondary hosts, to determine whether the secondary hosts are synchronized with the primary host prior to initiating a parallel backup of the Mongo database. Additionally, or alternatively, the DMS 110 may use the oplogs generated by the non-relational database to capture additional changes to a non-relational database after the initiation of the backup of the non-relational database.

Figure 2:
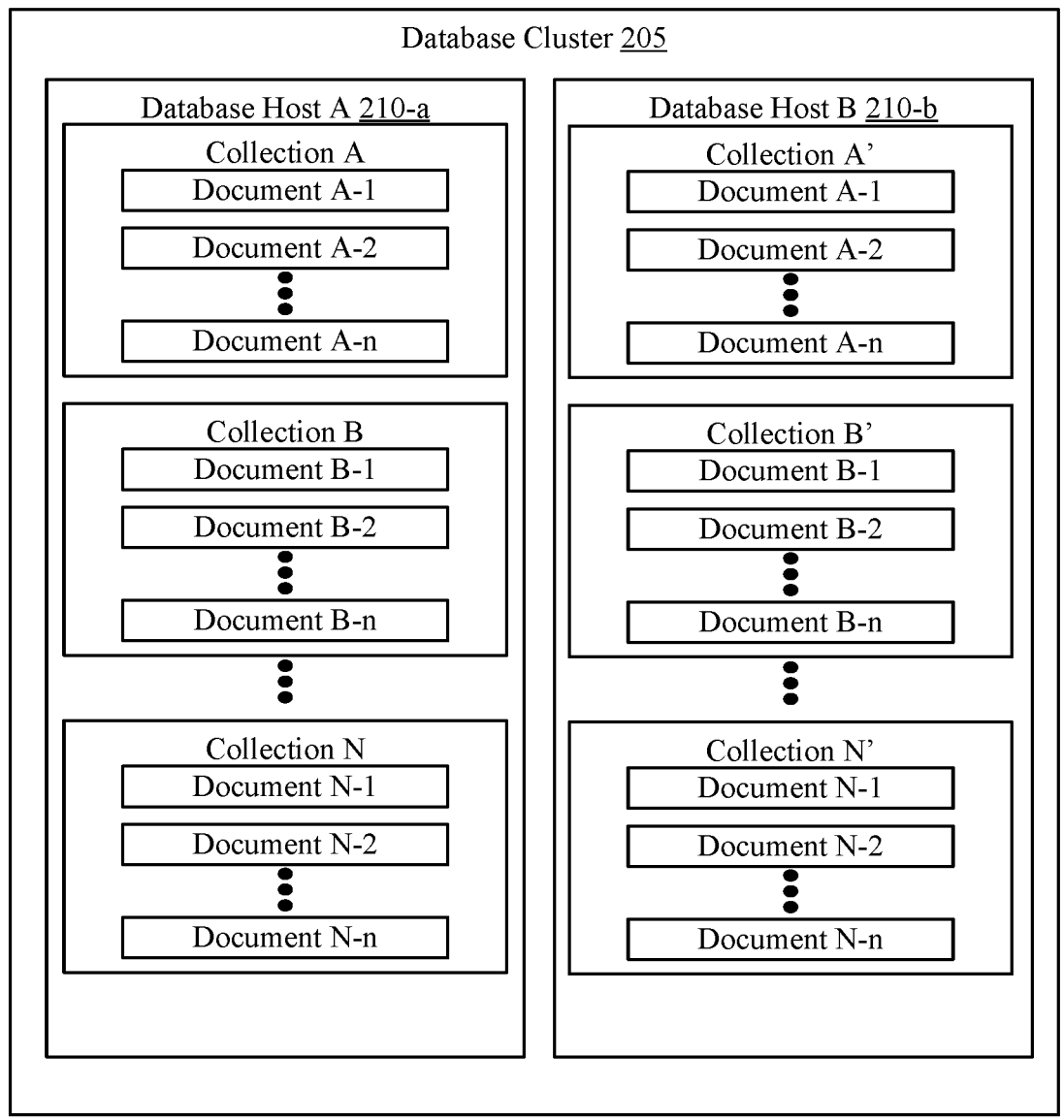
FIG. 2 shows an example of a non-relational database cluster that supports backup management of non-relational databases in accordance with aspects of the present disclosure.

FIG. 2 shows an example of a diagram 200 of a non-relational database cluster 205 that supports backup management of non-relational databases in accordance with aspects of the present disclosure. The diagram 200 may implement or may be implemented by one or more aspects of the computing environment 100. For example, a DMS 110 may backup (e.g., may capture snapshots of) data stored at the non-relational database cluster 205.

The non-relational database cluster 205 may include multiple non-relational database hosts 210 that include copies of the same data (e.g., include synchronized copies of a non-relational database). For example, the non-relational database cluster 205 may include a non-relational database host A 210-a and a non-relational database host B 210-b. The non-relational database host A 210-a may store a first copy of the non-relational database and the non-relational database host B 210-b may store a second copy of the non-relational database. To maintain copies of the same data (e.g., the non-relational database), data may be replicated from the non-relational database host A 210-a to the non-relational database host B 210-b (e.g., the non-relational database host A 210-a may be a primary host and the non-relational database host B 210-b may be a secondary host). In some examples, the non-relational database host A 210-a and the non-relational database host B 210-b may host a Mongo database.

As hosting a non-relational database, the non-relational database host A 210-a and non-relational database host B 210-b may store collections of data including one or more documents. For example, the non-relational database host A 210-a may store a collection A which includes documents A-1 through A-n, a collection B which includes documents B-1 through B-n, and a collection N which includes documents N-1 through N-n. The non-relational database host B 210-b may store a copy of the data stored at the non-relational database host A 210-a, and accordingly the non-relational database host B 210-b may store a collection A' which includes documents A-1 through A-n (e.g., the collection A' may be a copy of the collection A), a collection B' which includes documents B-1 through B-n (e.g., the collection B' may be a copy of the collection B), and a collection N' which includes documents N-1 through N-n (e.g., the collection N' may be a copy of the collection N). In some examples, a document in a non-relational database may be a key value pair list or array or a nested document. In some examples, a non-relational database may store data records as binary JSON (BSON) documents (e.g., a BSON may be a binary representation of a JSON document).

Figure 3:
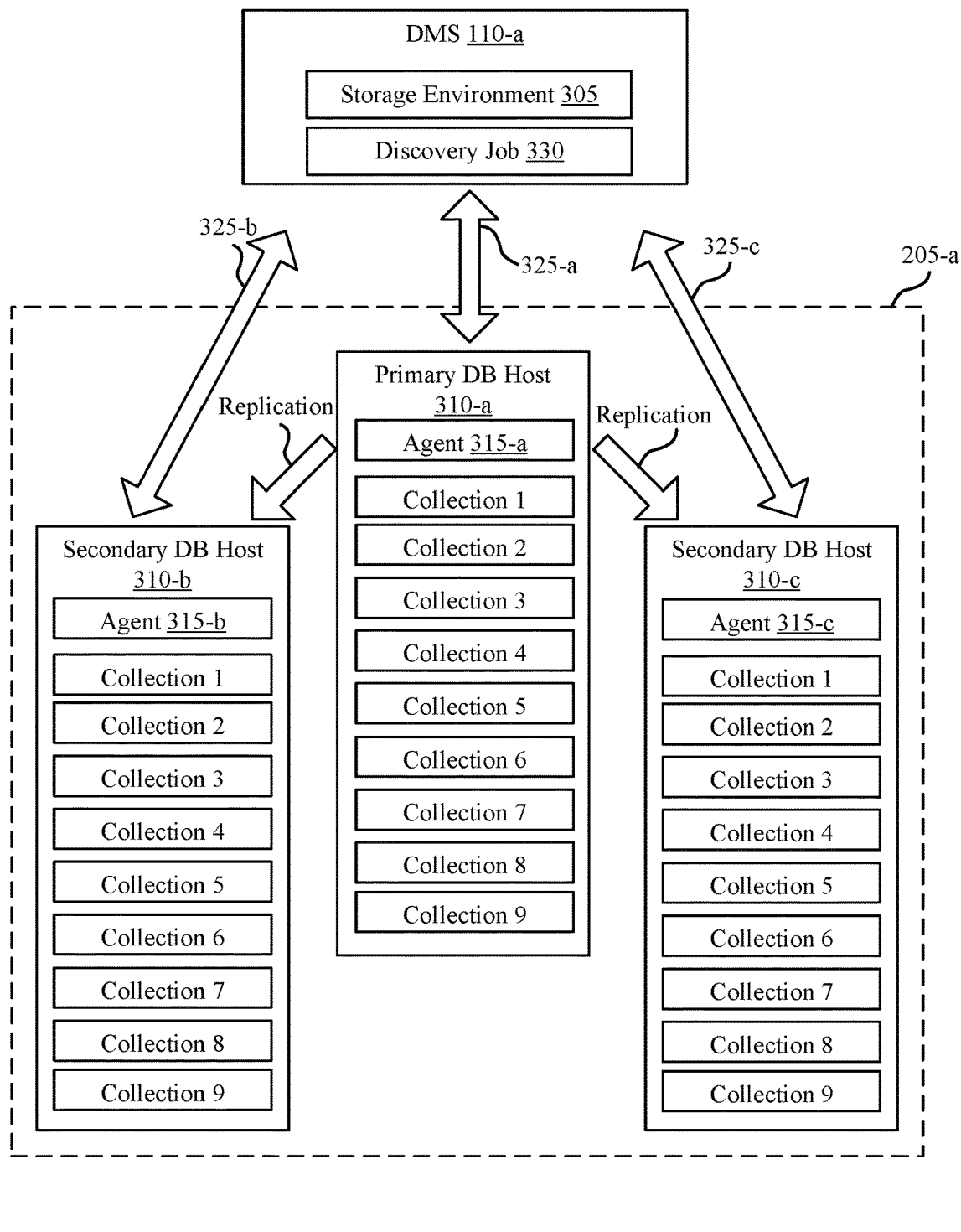
FIG. 3 shows an example of a computing environment that supports backup management of non-relational databases in accordance with aspects of the present disclosure.

FIG. 3 shows an example of a computing environment 300 that supports backup management of non-relational databases in accordance with aspects of the present disclosure. The computing environment 300 may implement or may be implemented by one or more aspects of the computing environment 100 or the diagram 200. For example, the computing environment 300 includes a DMS 110-a which may be an example of the DMS 110 as described herein. The computing environment 300 may include a non-relational database cluster 205-a which may be an example of a non-relational database cluster 205 as described with reference to FIG. 2. The computing environment 300 may include a storage environment 305, which may be hosted locally at the DMS 110-a (e.g., one or more storage nodes 185 at the DMS 110) or may be accessible to the DMS 110-a (e.g., or one or more node clusters 196 at the cloud environment 195).

The database cluster 205-a may include non-relational database hosts 310. The non-relational database hosts 310 may be examples of the non-relational database hosts 210 as described with reference to FIG. 2. For example, the non-relational database host 310-a may be a primary host for a non-relational database, and the non-relational database host 310-b and the non-relational database host 310-c may be secondary hosts for the non-relational database. For example, data stored in the non-relational database host 310-a may be replicated to the non-relational database host 310-b and the non-relational database host 310-c. For example, each of the non-relational database host 310-a, the non-relational database host 310-b, and the non-relational database host 310-c may store copies of nine collections as shown in FIG. 3.

The DMS 110-a may provide backup and recovery services for the database cluster 205-a. For example, the DMS 110-a may capture snapshots of the non-relational database stored at the non-relational database hosts 310 (e.g., the collections 1 through 9). For example, the DMS 110-a may communicate with an agent 315 of the DMS 110-a at each of the non-relational database host 310-b and the non-relational database host 310-c. For example, the DMS 110-a may instantiate or communicate with an agent 315-a at the non-relational database host 310-a via a connection 325-a (e.g., via a network 120 as described with reference to FIG. 1) with the non-relational database host 310-a. The DMS 110-a may instantiate or communicate with an agent 315-b at the non-relational database host 310-b via a connection 325-b (e.g., via a network 120 as described with reference to FIG. 1) with the non-relational database host 310-b. The DMS 110-a may instantiate or communicate with an agent 315-c at the non-relational database host 310-c via a connection 325-c (e.g., via a network 120 as described with reference to FIG. 1) with the non-relational database host 310-c.

In some examples, to decrease latency associated with backing up the data at the non-relational database hosts 310, the DMS 110-a may extract data from the non-relational database hosts 310 in parallel. For example, the DMS 110-a may extract data from collections 1 through 3 from the non-relational database host 310-a, the DMS 110-a may extract data from collections 4 through 6 from the non-relational database host 310-b, and the DMS 110-a may extract data from collections 7 through 9 from the non-relational database host 310-c. Parallel extraction from multiple hosts may enable the DMS 110-a to leverage resources of the multiple hosts and speed up the backup process (e.g., using an agent 315 at each host). Although shown as three non-relational database hosts 310, data stored on a non-relational database host 310 may be replicated to any quantity of non-relational database hosts 310 (e.g., 2, 3, 4, 5, etc.), and a DMS 110-a may correspondingly extract data from the quantity of non-relational database hosts in parallel.

In some examples, prior to initiating a backup process from multiple hosts in parallel, the DMS 110-a may check whether the hosts are synchronized. For example, the DMS 110-a may check whether the data at the non-relational database host 310-a has been replicated to the non-relational database host 310-b and the non-relational database host 310-c. For example, the DMS 110-a (or the agent 315-a of the DMS 110-a) may insert a marker document that includes a timestamp into a known location (e.g., one of the collections) at the non-relational database host 310-a. For example, the known location may be a collection managed by the DMS 110-a. Once the DMS 110-a identifies that the marker document including the timestamp is at the same location at the non-relational database host 310-b, the DMS 110-a may determine that the non-relational database host 310-b is synchronized to the non-relational database host 310-a as of the timestamp of the marker document and that the insertion of the marker document is included in a log snapshot for the non-relational database host 310-a. For example, to perform a replication after an initial replication, the primary host (e.g., the non-relational database host 310-a) may capture a log snapshot indicating changes to documents (e.g., new documents, deleted documents, or modified documents) in the collections of the non-relational database host 310-a since a prior log snapshot. The changes indicated by the log snapshot may then be replicated to the secondary hosts (e.g., the non-relational database host 310-b and the non-relational database host 310-c) to maintain synchronization between the primary and secondary hosts. Thus, the insertion of a marker document into the primary host may be identified in a log snapshot.

Upon determining that the non-relational database host 310-b is synchronized to the non-relational database host 310-a as of the timestamp of the marker document, the DMS 110-a may initiate a parallel backup process from the non-relational database host 310-a and the non-relational database host 310-b. Similarly, once the DMS 110-a identifies that the marker document including the timestamp is at the same location at the non-relational database host 310-c, the DMS 110-a may determine that the non-relational database host 310-b is synchronized to the non-relational database host 310-a as of the timestamp of the marker document.

For a parallel extraction, the collections (e.g., collections 1 through 9) may be divided into collections groups. For example, a collection group 1 that may be extracted from the non-relational database host 310-a may include collections 1-3, a collection group 2 that may be extracted from the non-relational database host 310-b may include collections 4-6, and a collection group 3 that may be extracted from the non-relational database host 310-c may include collections 7-9. In some examples, the collections may be divided into collections groups based on collection indices (e.g., such that the DMS 110-a will extract an equal or approximately equal quantity of collections from each non-relational database host). In some examples, the collections may be divided into collections groups based on data size (e.g., some collections may be larger than other collections, and thus the DMS 110-a may extract more collections from one non-relational database host 310 than another but the DMS 110-a may extract an approximately equal amount of data from each non-relational database). Each collection group may have a separate extraction path (e.g., the connection 325-a for the collection group from the non-relational database host 310-a, the connection 325-b for the collection group from the non-relational database host 310-b, and the connection 325-c for the collection group from the non-relational database host 310-c). For example, the separate extraction paths may be separate network file system (NFS) export paths. For example, the data may be extracted and sent to the storage environment 305 in an AF2 file format.

In some examples, the DMS 110-a may include a discovery job 330 which may identify the non-relational databases which host the replicated data. In some examples, the discovery job 330 may identify that the non-relational database hosts 310 are synchronized.

As described herein, the non-relational database host 310-a may capture log snapshots (e.g., periodically) to identify changes to the non-relational database host 310-a and replicate the changes to the non-relational database host 310-b and the non-relational database host 310-c. In some examples, when the DMS 110-a obtains an indication to capture a full snapshot of the non-relational database stored at the non-relational database hosts 310, the DMS 110-a may trigger (e.g., the agent 315 may trigger) an on-demand log snapshot for the non-relational database. For example, the DMS 110-a may obtain an indication to trigger a full snapshot of the non-relational database stored at the non-relational database hosts 310 based on a service level agreement (SLA) with a customer of the DMS 110-a associated with the non-relational database, where the SLA schedules periodic backups of the non-relational database stored at the non-relational database hosts 310. As another example, the DMS 110-a may receive an indication to capture a snapshot of the non-relational database stored at the non-relational database hosts 310 from an administrative account associated with a customer of the DMS 110-a associated with the non-relational database (e.g., from a computing device 115 associated with the administrative account).

In some examples, the DMS 110-a may wait (e.g., the agents 315 may wait) until the on-demand log snapshot completes to begin the full snapshot (e.g., parallel extraction from the non-relational database hosts 310). In some examples, waiting for a log snapshot to complete may guarantee that any change events happening to the data source for the non-relational database stored at the non-relational database hosts 310 are captured in the snapshot of the non-relational database. After the on-demand log snapshot completes, the DMS 110-a may check whether the DMS 110-a may start a full extraction from the non-relational database hosts 310. For example, the DMS 110-a may perform an application programming interface (API)

call to a given host that may check (e.g., verify that) the host is capturing change events related to the corresponding non-relational database. For example, the API call may be a "canStartMongodbFullbackupExtraction" API call. In some examples, the API may indicate a timestamp of a last marker document inserted into the primary host, and the API may return an indication of whether a secondary host includes the marker document with the indicated timestamp. If the API call indicates that the secondary host includes the maker document with the indicated timestamp, the DMS 110-a may determine that the secondary host is synchronized with the primary host and data may be extracted in parallel from the primary host and the secondary host.

In some examples, in response to verifying that the host is capturing change events related to the corresponding non-relational database hosts 310, the DMS 110-a may begin the full extraction process from that host. For example, the DMS 110-a may cause the agent 315-a to start the full extraction process of the collection group from the non-relational database host 310-a in response to verifying that the host of the non-relational database host 310-a is capturing change events related to the non-relational database host 310-a. In some examples, to extract data from the collection group from the non-relational database host 310-a, the agent 315-a may: export the NFS path for the collection group to the DMS 110-a and mount the directory on the host of the non-relational database host 310-a. In response, the DMS 110-a may send an API call (e.g., "startMongodbFullbackupExtraction") to the host of the non-relational database host 310-a (e.g., to the agent 315-a) that initiates the extraction process for the collection group. The API call may contain the list of collections to be extracted from the non-relational database host 310-a (e.g., the collection group). The DMS 110-a may perform a similar process to verify and extract data from the other non-relational database hosts 310 (e.g., the non-relational database host 310-b and the non-relational database host 310-c). In some examples, the DMS 110-a may perform parallel extractions of collections from a same non-relational database host 310 based on capabilities of the non-relational database host 310. For example, the DMS 110-a may extract the collection 1 and the collection 2 from the non-relational database host 310-a in parallel.

In some examples, the DMS 110-a may wait for the extraction process to complete. The DMS 110-a may perform an API call to check the progress of the extraction process for a given non-relational database host 310 (e.g., an API call "getFullbackupExtractionStatus.") Once the full extraction process is complete for a given non-relational database (e.g., for the collection group from a given non-relational database), the DMS 110-a may wait for a log snapshot to be completed for the non-relational database host 310 after the completion of the full extraction. The log snapshot to be completed for the non-relational database host 310 after the completion of the full extraction may track any changes that occurred to the non-relational database host 310 (e.g., at the source of data for the non-relational database host 310) during the full extraction process. Once the log snapshot is completed, the DMS 110-a may perform post processing on the data in the full extraction based on the log snapshot to update the data in the full extraction based on the changes that occurred during the full extraction process as reflected by the log snapshot. The updated data in the full extraction may be exposed as a full snapshot of the non-relational database stored at the non-relational database host 310 (e.g., for the collection group) and may be stored in the storage environment 305.

Figure 4:
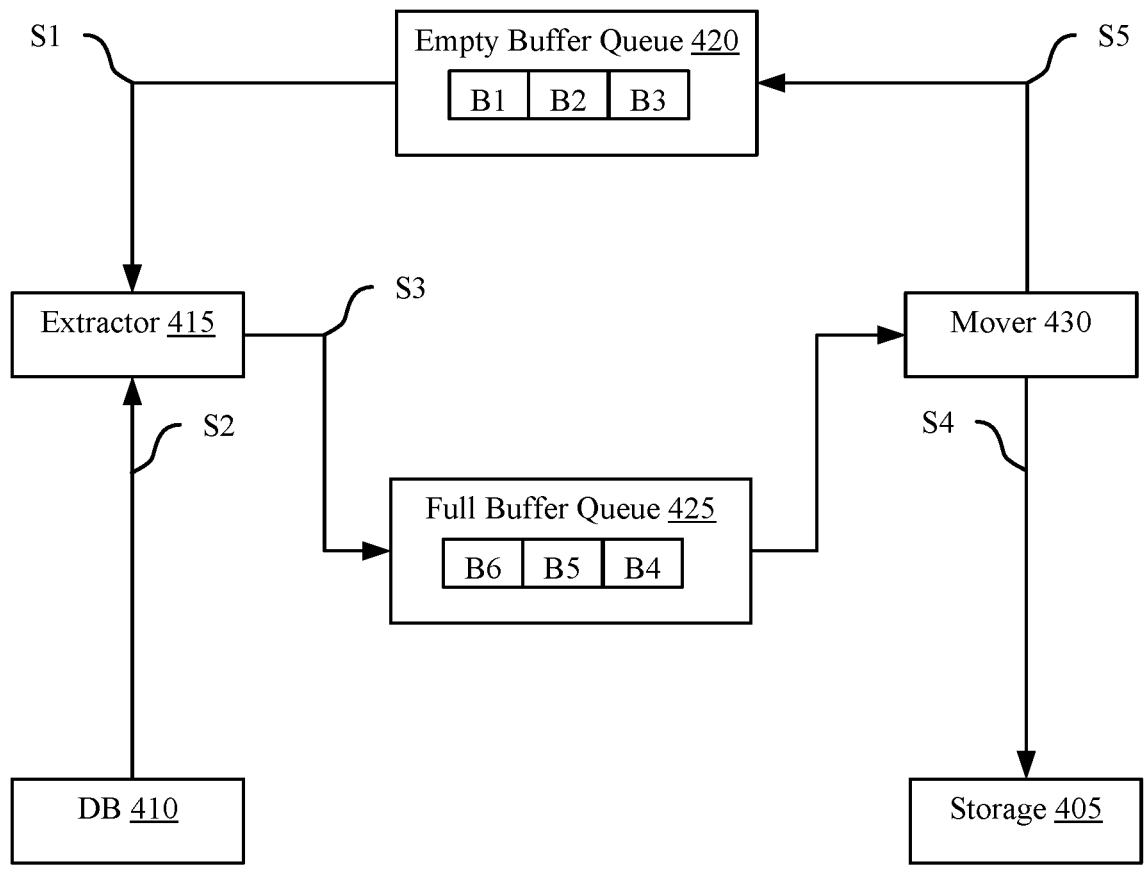
FIG. 4 shows an example of a backup process that uses multiple buffer queues that supports backup management of non-relational databases in accordance with aspects of the present disclosure.

FIG. 4 shows an example of a diagram of a backup process 400 that uses multiple buffer queues that supports backup management of non-relational databases in accordance with aspects of the present disclosure. The diagram of the backup process 400 may implement or may be implemented by one or more aspects of the computing environment 100, the diagram 200, or the computing environment 300. For example, the diagram of the backup process 400 may include a storage environment 405, which may be an example of a storage environment 305 as described with reference to FIG. 3.

A DMS 110 may provide backup and recovery services for a non-relational database 410. For example, an agent 315 of the DMS 110-a at the host of the non-relational database 410 may extract data from one or more collections at the non-relational database 410 and move the data (e.g., copy the data) to the storage environment 405 (e.g., a remote storage environment). In some examples, the agent 315 may initiate an extractor 415 and a mover 430. The extractor 415 and the mover 430 may operate based on a producer/consumer paradigm, where the extractor 415 is the producer and the mover 430 is the consumer. The extractor 415 may extract data from the non-relational database 410 and may write data to a buffer of the agent (e.g., at the host of the non-relational database 410). The extractor 415 may be a single threaded execution. The mover 430 may move the data from the buffer to the storage environment 405. The mover 430 may be a single threaded execution. To reduce latency (e.g., to prevent blocking each other), the extractor 415 and the mover 430 may use separate buffer pools (e.g., buffer queues). Accordingly, the agent 315 may use the extractor 415 and the mover 430 to perform one or more iterations of a backup process for a given collection to extract and move data from the collection of the non-relational database 410 to the storage environment until all of the information in the collection is moved to the storage environment 405 (or for an incremental snapshot, all of the new or modified data in the collection is moved to the storage environment 405). The extractor 415 may use a cursor of the driver of the host of the non-relational database 410 to iterate through the documents in the relevant collection and read and extract the documents.

In some examples, when the agent 315 is indicated by the DMS 110 to initiate a backup for a collection at the non-relational database 410, the agent may initiate the extractor 415 and the mover 430. The agent 315 may perform separate backup processes for each collection at a non-relational database, and accordingly, the agent 315 may initiate separate extractors and movers for each collection to be backed up.

At a first step of an iteration (S1), the extractor may retrieve (e.g., consume) a buffer from an empty buffer queue 420 of the agent 315. A buffer may be a pre-allocated memory of the agent 315 (e.g., 32 MB). The size of the buffer may be configurable. At a second step (s2) of the iteration the extractor 415 may write data from the collection of the non-relational database 410 to the retrieved buffer (e.g., until the buffer is full). At a third step (s3) of the iteration, the extractor 415 may move the buffer to a full buffer queue 425 of the agent 315. At a fourth step (s4) of the iteration, the mover 430 may consume (e.g., retrieve or select a buffer from the full buffer queue 425) and may move (e.g., copy) data from the consumed buffer to the storage environment 405. For example, the mover 430 may move the data using an NFS as described herein. At a fifth step (s5) of the iteration, after the data on the buffer is moved to the storage environment 405 (e.g., published to the storage environment 405), the mover 430 may move the buffer back to the empty buffer queue so that the buffer may be reused by the extractor 415. The extractor 415 and the mover 430 may perform the iterations until all the data from the corresponding collection is moved to the storage environment 405 (or for an incremental snapshot, all of the new or modified data in the collection is moved to the storage environment 405).

Figure 5:
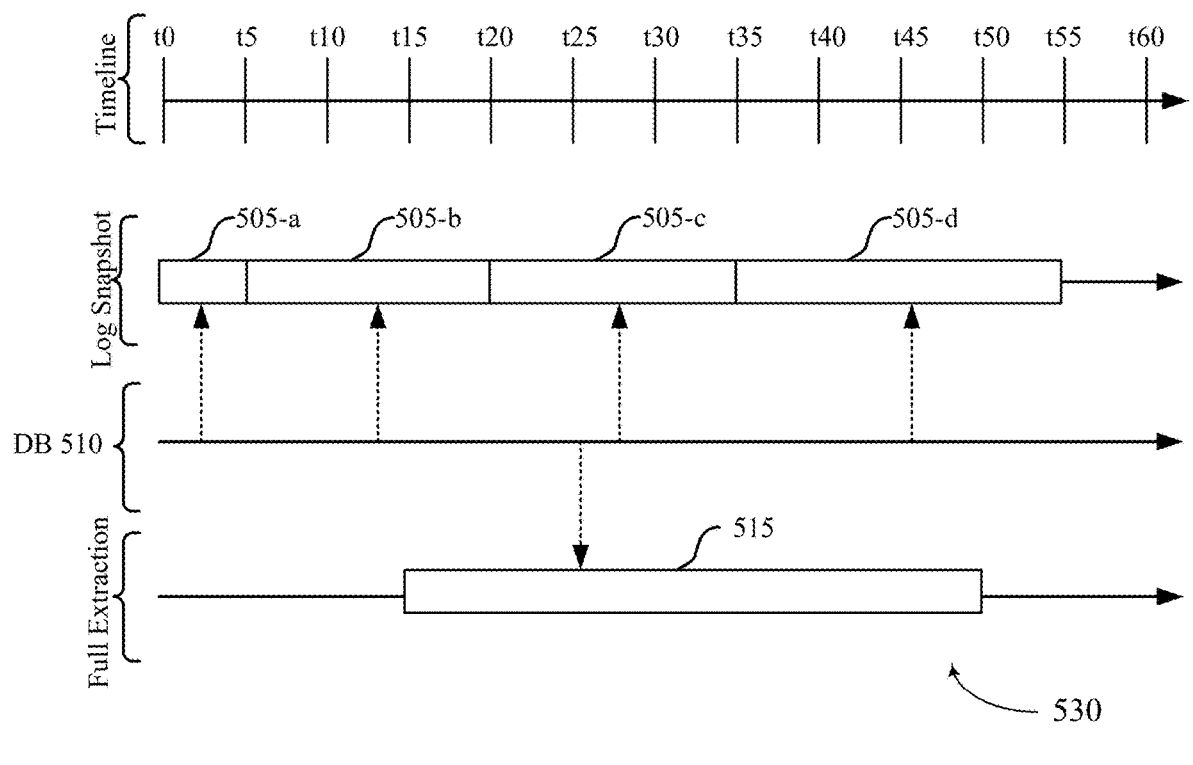
FIG. 5 shows an example of a backup process timeline diagram that supports backup management of non-relational databases in accordance with aspects of the present disclosure.
Figure 5:
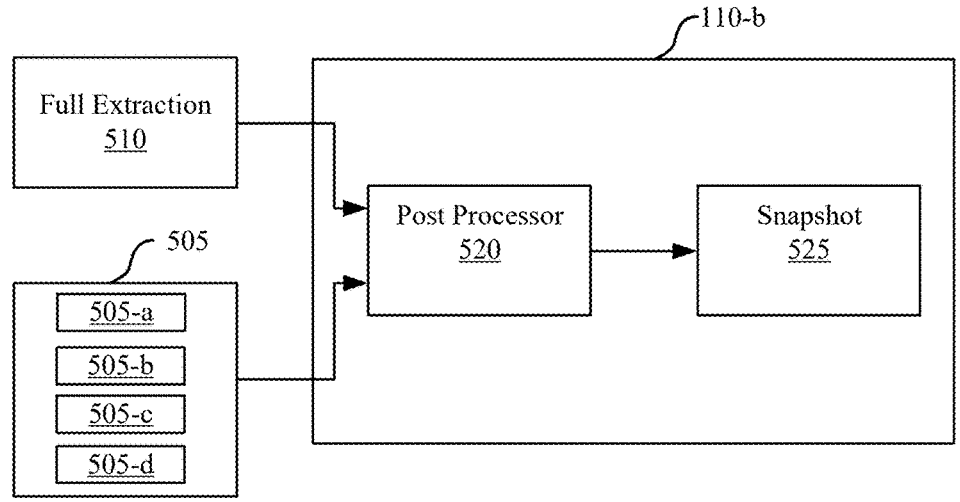

FIG. 5 shows an example of a backup process timeline diagram 500 that supports backup management of non-relational databases in accordance with aspects of the present disclosure. The backup process timeline diagram 500 may implement or may be implemented by one or more aspects of the computing environment 100, the diagram 200, the computing environment 300, or the diagram of the backup process 400. For example, the backup process timeline diagram 500 may include a non-relational database 510, which may be an example a non-relational database 410 as described with reference to FIG. 4. The backup process timeline diagram 500 may include a DMS 110-*b*, which may be an example of a DMS 110 as described herein.

As described herein, a DMS 110-*b* may cause an agent of the DMS 110-*b* at the non-relational database 510 to perform a full extraction 515 of data at the non-relational database 510 (e.g., from one or more collections of the non-relational database 510 at a host of the non-relational database 510). The full extraction 515 may be transferred to the DMS 110-*b* (e.g., to a storage environment at the DMS 110-*b* or accessible to the DMS 110-*b*).

As described herein, the non-relational database 510 may capture log snapshots 505 (e.g., periodically) to identify changes to the non-relational database 510 and replicate the changes to other hosts of the non-relational database. For example, log snapshots 505 may be captured at a high frequency, such as every 15 minutes or every 30 minutes. Log snapshots 505 may capture change events that occur at the non-relational database 510.

As shown in the timeline 530, the full extraction may begin at t15 once the log snapshots have been running. A first log snapshot 505-*a* may be initiated at t0 prior to initiation of the full extraction at t15. A second log snapshot 505-*b* may be initiated at t5 prior to initiation of the full extraction at t15. A third log snapshot 505-*c* may be initiated at t20 during the full extraction at t15. A fourth log snapshot 505-*d* may be initiated at t35 during the full extraction at t15.

The full extraction 515 may be combined with one or more log snapshots by a post processor 520 (e.g., at the DMS 110) to create a snapshot 525 of the non-relational database 510 (e.g., of the collections corresponding to the full extraction 515). For example, as shown in FIG. 5, the log snapshots 505 begin before the full extraction 515 is initiated at t15. As shown in FIG. 5, the full extraction 515 is completed at t50. Accordingly, the full extraction 515 may not include changes that occur to the non-relational database 510 during the full extraction 515 (e.g., between t15 and t50). The post processor may generate the snapshot 525 based on updating the full extraction 515 to include the changes that occurred between t15 and t50 to the non-relational database 510 as reflected by the log snapshots 505 (e.g., the second log snapshot 505-*b*, the third log snapshot 505-*c*, and the fourth log snapshot 505-*d*).

Figure 6:
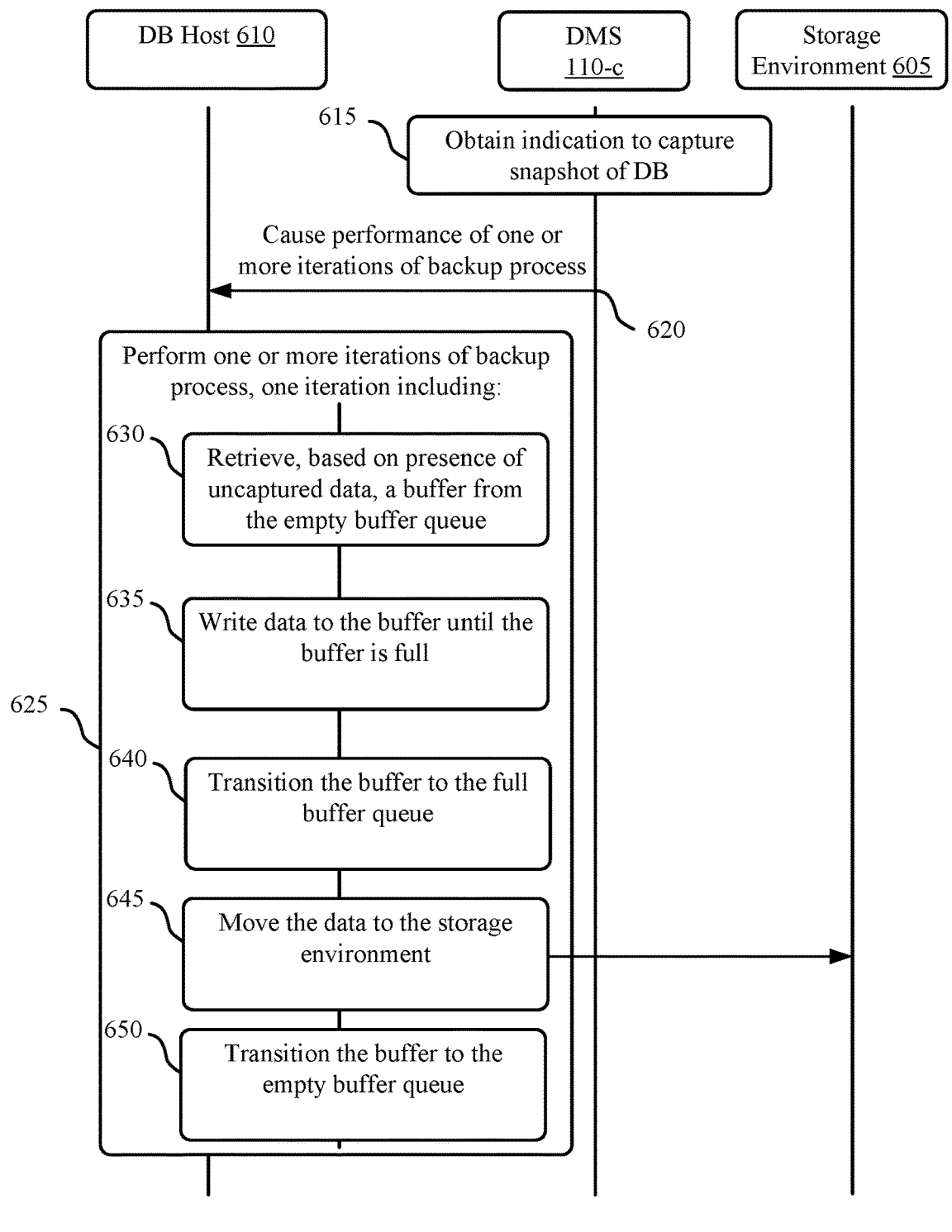
FIG. 6 shows an example of a process flow that supports backup management of non-relational databases in accordance with aspects of the present disclosure.

FIG. 6 shows an example of a process flow 600 that supports backup management of non-relational databases in accordance with aspects of the present disclosure. The process flow 600 may implement or may be implemented by one or more aspects of the computing environment 100, the diagram 200, the computing environment 300, the diagram of the backup process 400, or the backup process timeline diagram 500. For example, the process flow 600 may include a DMS 110-*c*, which may be an example of a DMS 110 as described herein. The process flow 600 may include a remote storage environment 605, which may be an example of a storage environment 305 as described with reference to FIG. 3 or a storage environment 405 as described with reference to FIG. 4. The process flow 600 may include a host 610 of a non-relational database, which may be an example of a non-relational database host 210 as described with reference to FIG. 2 or a non-relational database host 310 as described with reference to FIG. 3. In the following description of the process flow 600, operations between the DMS 110-*b*, the remote storage environment 605, and the host 610 may be added, omitted, or performed in a different order (with respect to the exemplary order shown).

The DMS 110-*c* may be configured to manage backup operations for a non-relational database. The non-relational database may be hosted at the host 610. At 615, the DMS 110-*c* may obtain an indication to capture a snapshot of the non-relational database from the host 610 of the non-relational database.

At 620, the DMS 110-*c* may cause an agent of the DMS 110-*c* at the host 610 to perform one or more iterations of a backup process until the snapshot is captured.

At 625, the agent of the DMS 110-*c* may perform the one or more iterations of the backup process until the snapshot is captured.

One iteration of the backup process may include: at 630, retrieving, based on a presence of uncaptured data in the non-relational database, a buffer at the agent from an empty buffer queue for the agent; at 635 writing, based on the buffer being retrieved, data from the non-relational database into the buffer until the buffer is full, where the data includes at least a portion of the uncaptured data; at 640 transitioning, based upon filling of the buffer with the data, the buffer to a full buffer queue for the agent; at 645 moving, based on the buffer being transitioned to the full buffer queue, the data from the buffer to the remote storage environment 605 accessible to the DMS 110-*c*; and at 650 transitioning, based on completion of moving the data to the remote storage environment 605, the buffer from the full buffer queue to the empty buffer queue.

In some examples, the snapshot is associated with a set of collections of data stored at both the host 610 and a second host of the non-relational database. The DMS 110-*c* may cause performance of one or more second iterations of the backup process by a second agent of the DMS 110-*c* at the second host until a second portion of the snapshot is captured from the second host, where performance by the agent of the DMS of the one or more iterations of the backup process until the snapshot is captured involves performance of the one or more iterations until a first portion of the snapshot is captured from the host 610. The first portion may include a first subset of collections of the set of collections, and the second portion may include a second subset of collections of the set of collections. In some examples, the one or more iterations and the one or more second iterations may be performed in parallel. In some examples, the set of collections of data is also stored at a third host of the non-relational database, and the DMS 110-*c* may cause performance of one or more third iterations of the backup process by a third agent of the DMS 110-*c* at the third host until a third portion of the snapshot is captured from the second host, where the third portion includes a third subset of collections of the set of collections. In some examples, the host 610 is a primary host of the non-relational database and the second host and the third host are secondary hosts of the non-relational database that are configured to store respective copies of the non-relational database from the host.

In some examples, the DMS 110-*c* may determine a presence of a synchronization indicator document in a collection at the host, and causing performance of the one or more iterations is based on determination of the presence of the synchronization indicator document. In some examples, the DMS 110-*c* may cause insertion, prior to the determination of the presence of the synchronization indicator document in the collection at the host, of the synchronization indicator document into the collection at a second host of the non-relational database, where the second host and the host both store respective copies of the non-relational database. In some examples, the DMS 110-*c* may determine whether a timestamp indicated by the synchronization indicator document is later than a threshold time, and causing performance of the one or more iterations is based on a determination that the timestamp is later than the threshold time.

In some examples, the DMS 110-*c* may cause initiation, based on the indication to capture the snapshot, of an extractor job and a mover job for a first collection from a set of collections of data associated with the snapshot. The extractor job may perform for the first collection and as part of the one or more iterations of the backup process: the retrieving the buffer from the empty buffer queue; the writing the data from the non-relational database into the buffer; and the transitioning the buffer to the full buffer queue. The mover job may perform, for the first collection and as part of the one or more iterations of the backup process: the moving the data from the buffer to the remote storage environment; and the transitioning the buffer from the full buffer queue to the empty buffer queue. In some examples, the DMS 110-*c* may cause initiation, based on the indication to capture the snapshot, of a second extractor job and a second mover job for a second collection from the set of collections, and the DMS 110-*c* may cause performance by the agent of the DMS one or more second iterations of the backup process. An iteration of the one or more second iterations may involve: retrieving, by the second extractor job and based on a presence of second uncaptured data in the second collection, a second buffer at the agent from a second empty buffer queue for the agent; writing, by the second extractor job and based on the second buffer being retrieved, second data from the second collection into the second buffer until the second buffer is full, where the second data includes at least a second portion of the second uncaptured data; transitioning, by the second extractor job and based upon filling of the second buffer with the second data, the second buffer to a second full buffer queue for the agent; moving, by the second mover job and based on the second buffer being transitioned to the second full buffer queue, the second data from the second buffer to the remote storage environment; and transitioning, by the second mover job and based on completion of moving the second data to the remote storage environment, the second buffer from the second full buffer queue to the second empty buffer queue. In some examples, selecting the buffer from the empty buffer queue by the extractor job is based on the presence of the uncaptured data in the first collection. In some examples, the one or more iterations of the backup process for the first collection and the one or more second iterations of the backup process for the second collection are performed in parallel.

In some examples, the DMS 110-*c* may update the snapshot based on one or more change log files (e.g., log snapshots) that indicate one or more changes to the non-relational database during a time period in which the one or more iterations are performed. In some examples, the DMS 110-*c* may perform an API call to the host, and the DMS may receive, from the host 610 in response to the API call, an indication that the host 610 is configured to capture change log files for the non-relational database. Causing performance of the one or more iterations may be based on reception of the indication that the host 610 is configured to capture the change log files.

In some examples, writing data from the non-relational database into the buffer at 635 involves writing one or more documents into the buffer.

In some examples, obtaining the indication to capture the snapshot at 615 is based on determining that a time period since a last snapshot of the non-relational database satisfies a threshold time period (e.g., the DMS 110-*c* may be scheduled to capture periodic snapshots of the non-relational database).

In some examples, obtaining the indication to capture the snapshot at 615 is based on receiving an indication to capture the snapshot from a computing device (e.g., a computing device 115) associated with an administrative account associated with the non-relational database.

Figure 7:
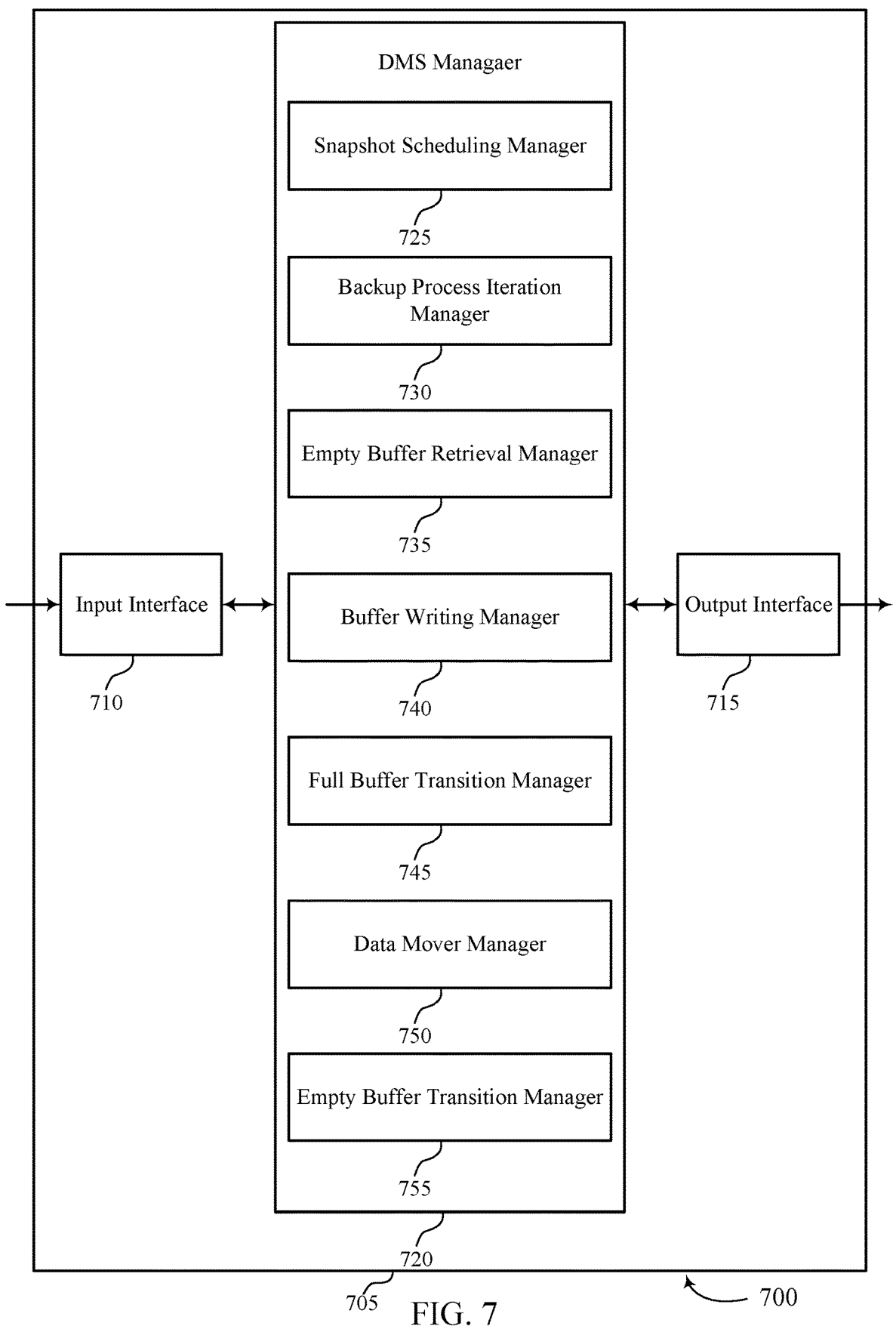
FIG. 7 shows a block diagram of an apparatus that supports backup management of non-relational databases in accordance with aspects of the present disclosure.

FIG. 7 shows a block diagram 700 of a system 705 that supports backup management of non-relational databases in accordance with aspects of the present disclosure. In some examples, the system 705 may be an example of aspects of one or more components described with reference to FIG. 1, such as a DMS 110. The system 705 may include an input interface 710, an output interface 715, and a DMS manager 720. The system 705 may also include one or more processors. Each of these components may be in communication with one another (e.g., via one or more buses, communications links, communications interfaces, or any combination thereof).

The input interface 710 may manage input signaling for the system 705. For example, the input interface 710 may receive input signaling (e.g., messages, packets, data, instructions, commands, or any other form of encoded information) from other systems or devices. The input interface 710 may send signaling corresponding to (e.g., representative of or otherwise based on) such input signaling to other components of the system 705 for processing. For example, the input interface 710 may transmit such corresponding signaling to the DMS manager 720 to support backup management of non-relational databases. In some cases, the input interface 710 may be a component of a network interface 925 as described with reference to FIG. 9.

The output interface 715 may manage output signaling for the system 705. For example, the output interface 715 may receive signaling from other components of the system 705, such as the DMS manager 720, and may transmit such output signaling corresponding to (e.g., representative of or otherwise based on) such signaling to other systems or devices. In some cases, the output interface 715 may be a component of a network interface 925 as described with reference to FIG. 9.

For example, the DMS manager 720 may include a snapshot scheduling manager 725 a backup process iteration manager 730, or any combination thereof. In some examples, the DMS manager 720, or various components thereof, may be configured to perform various operations (e.g., receiving, monitoring, transmitting) using or otherwise in cooperation with the input interface 710, the output interface 715, or both. For example, the DMS manager 720 may receive information from the input interface 710, send information to the output interface 715, or be integrated in combination with the input interface 710, the output interface 715, or both to receive information, transmit information, or perform various other operations as described herein.

The DMS manager 720 may support data management in accordance with examples as disclosed herein. The snapshot scheduling manager 725 may be configured as or otherwise support a means for obtaining, by a DMS configured to manage backup operations for a non-relational database, an indication to capture a snapshot of the non-relational database from a host of the non-relational database. The backup process iteration manager 730 may be configured as or otherwise support a means for causing, by the DMS, performance by an agent of the DMS at the host of one or more iterations of a backup process until the snapshot is captured. In some examples, to perform an iteration of the backup process, the empty buffer retrieval manager 735 may be configured as or otherwise support a means for retrieving, based on a presence of uncaptured data in the non-relational database, a buffer at the agent from an empty buffer queue for the agent, the buffer writing manager 740 may be configured as or otherwise support a means for writing, based on the buffer being retrieved, data from the non-relational database into the buffer until the buffer is full, where the data includes at least a portion of the uncaptured data, the full buffer transition manager 745 may be configured as or otherwise support a means for transitioning, based at least in part upon filling of the buffer with the data, the buffer to a full buffer queue for the agent, the data mover manager 750 may be configured as or otherwise support a means for moving, based on the buffer being transitioned to the full buffer queue, the data from the buffer to a remote storage environment accessible to the DMS, and the empty buffer transition manager 755 may be configured as or otherwise support a means for transitioning, based on completion of moving the data to the remote storage environment, the buffer from the full buffer queue to the empty buffer queue.

Figure 8:
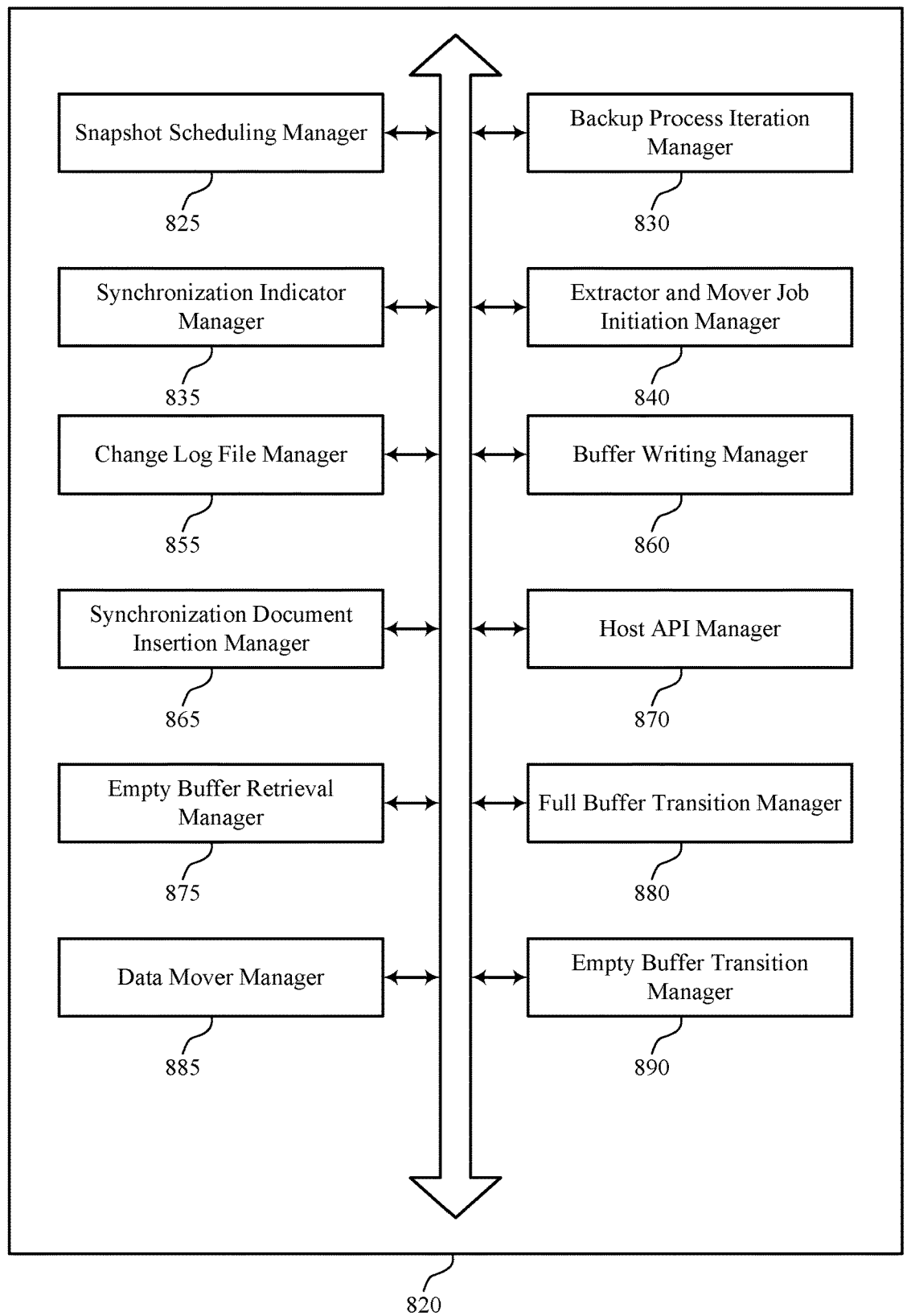
FIG. 8 shows a block diagram of a data management system that supports backup management of non-relational databases in accordance with aspects of the present disclosure.

FIG. 8 shows a block diagram 800 of a DMS manager 820 that supports backup management of non-relational databases in accordance with aspects of the present disclosure. The DMS manager 820 may be an example of aspects of a DMS manager or a DMS manager 720, or both, as described herein. The DMS manager 820, or various components thereof, may be an example of means for performing various aspects of backup management of non-relational databases as described herein. For example, the DMS manager 820 may include a snapshot scheduling manager 825, a backup process iteration manager 830, a synchronization indicator manager 835, an extractor and mover job initiation manager 840, a change log file manager 855, a buffer writing manager 860, a synchronization document insertion manager 865, a host API manager 870, an empty buffer retrieval manager 875, a full buffer transition manager 880, a data mover manager 885, an empty buffer transition manager 890, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The DMS manager 820 may support data management in accordance with examples as disclosed herein. The snapshot scheduling manager 825 may be configured as or otherwise support a means for obtaining, by a DMS configured to manage backup operations for a non-relational database, an indication to capture a snapshot of the non-relational database from a host of the non-relational database. The backup process iteration manager 830 may be configured as or otherwise support a means for causing, by the DMS, performance by an agent of the DMS at the host of one or more iterations of a backup process until the snapshot is captured. In some examples, to perform an iteration of the backup process, the empty buffer retrieval manager 875 may be configured as or otherwise support a means for retrieving, based on a presence of uncaptured data in the non-relational database, a buffer at the agent from an empty buffer queue for the agent, the buffer writing manager 860 may be configured as or otherwise support a means for writing, based on the buffer being retrieved, data from the non-relational database into the buffer until the buffer is full, where the data includes at least a portion of the uncaptured data, the full buffer transition manager 880 may be configured as or otherwise support a means for transitioning, based at least in part upon filling of the buffer with the data, the buffer to a full buffer queue for the agent, the data mover manager 885 may be configured as or otherwise support a means for moving, based on the buffer being transitioned to the full buffer queue, the data from the buffer to a remote storage environment accessible to the DMS, and the empty buffer transition manager 890 may be configured as or otherwise support a means for transitioning, based on completion of moving the data to the remote storage environment, the buffer from the full buffer queue to the empty buffer queue.

In some examples, the snapshot is associated with a set of collections of data that are stored at both the host and a second host of the non-relational database, and the backup process iteration manager 830 may be configured as or otherwise support a means for causing, by the DMS, performance of one or more second iterations of the backup process by a second agent of the DMS at the second host until a second portion of the snapshot is captured from the second host, where performance by the agent of the DMS of the one or more iterations of the backup process until the snapshot is captured includes performance of the one or more iterations until a first portion of the snapshot is captured from the host, the first portion including a first subset of collections of the set of collections, and the second portion including a second subset of collections of the set of collections.

In some examples, the one or more iterations and the one or more second iterations are performed in parallel.

In some examples, the set of collections of data is also stored at a third host of the non-relational database, and the backup process iteration manager 830 may be configured as or otherwise support a means for causing, by the DMS, performance of one or more third iterations of the backup process by a third agent of the DMS at the third host until a third portion of the snapshot is captured from the second host, where the third portion includes a third subset of collections of the set of collections.

In some examples, the host is a primary host of the non-relational database. In some examples, the second host and the third host are secondary hosts of the non-relational database that are configured to store respective copies of the non-relational database from the host.

In some examples, the synchronization indicator manager 835 may be configured as or otherwise support a means for determining, by the DMS, a presence of a synchronization indicator document in a collection at the host, where causing performance of the one or more iterations is based on determination of the presence of the synchronization indicator document.

In some examples, the synchronization document insertion manager 865 may be configured as or otherwise support a means for causing insertion, by the DMS and prior to the determination of the presence of the synchronization indicator document in the collection at the host, of the synchronization indicator document into the collection at a second host of the non-relational database, where the second host and the host both store respective copies of the non-relational database.

In some examples, the synchronization indicator manager 835 may be configured as or otherwise support a means for determining whether a timestamp indicated by the synchronization indicator document is later than a threshold time, where causing performance of the one or more iterations is based on a determination that the timestamp is later than the threshold time.

In some examples, the extractor and mover job initiation manager 840 may be configured as or otherwise support a means for causing initiation, by the DMS and based on the indication to capture the snapshot, of an extractor job and a mover job for a first collection from a set of collections of data associated with the snapshot. The extractor job may perform, for the first collection and as part of the one or more iterations of the backup process: the retrieving the buffer from the empty buffer queue; the writing the data from the non-relational database into the buffer; and the transitioning the buffer to the full buffer queue. The mover job may perform, for the first collection and as part of the one or more iterations of the backup process: the moving the data from the buffer to the remote storage environment; and the transitioning the buffer from the full buffer queue to the empty buffer queue.

In some examples, the extractor and mover job initiation manager 840 may be configured as or otherwise support a means for causing initiation, by the DMS and based on the indication to capture the snapshot, of a second extractor job and a second mover job for a second collection from the set of collections. In some examples, the backup process iteration manager 830 may be configured as or otherwise support a means for causing, by the DMS, performance by the agent of the DMS one or more second iterations of the backup process. In some examples, to a second iteration of the one or more second iterations, the empty buffer retrieval manager 875 may be configured as or otherwise support a means for retrieving, by the second extractor job and based on a presence of second uncaptured data in the second collection, a second buffer at the agent from a second empty buffer queue for the agent, the buffer writing manager 860 may be configured as or otherwise support a means for writing, by the second extractor job and based on the second buffer being retrieved, second data from the second collection into the second buffer until the second buffer is full, where the second data includes at least a second portion of the second uncaptured data, the full buffer transition manager 880 may be configured as or otherwise support a means for transitioning, by the second extractor job and based at least in part upon filling of the second buffer with the second data, the second buffer to a second full buffer queue for the agent, the data mover manager 885 may be configured as or otherwise support a means for moving, by the second mover job and based on the second buffer being transitioned to the second full buffer queue, the second data from the second buffer to the remote storage environment, and the empty buffer transition manager 890 may be configured as or otherwise support a means for transitioning, by the second mover job and based on completion of moving the second data to the remote storage environment, the second buffer from the second full buffer queue to the second empty buffer queue.

In some examples, selecting the buffer from the empty buffer queue by the extractor job is based on the presence of the uncaptured data in the first collection.

In some examples, the one or more iterations of the backup process for the first collection and the one or more second iterations of the backup process for the second collection are performed in parallel.

In some examples, the change log file manager 855 may be configured as or otherwise support a means for updating, by the DMS, the snapshot based on one or more change log files that indicate one or more changes to the non-relational database during a time period in which the one or more iterations are performed.

In some examples, the host API manager 870 may be configured as or otherwise support a means for performing, by the DMS, an application programming interface call to the host. In some examples, the change log file manager 855 may be configured as or otherwise support a means for receiving, by the DMS from the host in response to the application programming interface call, an indication that the host is configured to capture change log files for the non-relational database, where causing performance of the one or more iterations is based on reception of the indication that the host is configured to capture the change log files.

In some examples, to support writing data from the non-relational database into the buffer, the buffer writing manager 860 may be configured as or otherwise support a means for writing one or more documents into the buffer.

In some examples, to support obtaining the indication to capture the snapshot, the snapshot scheduling manager 825 may be configured as or otherwise support a means for determining, by the DMS, that a time period since a last snapshot of the non-relational database satisfies a threshold time period.

In some examples, to support obtaining the indication to capture the snapshot, the snapshot scheduling manager 825 may be configured as or otherwise support a means for receiving the indication to capture the snapshot from a computing device associated with an administrative account associated with the non-relational database.

Figure 9:
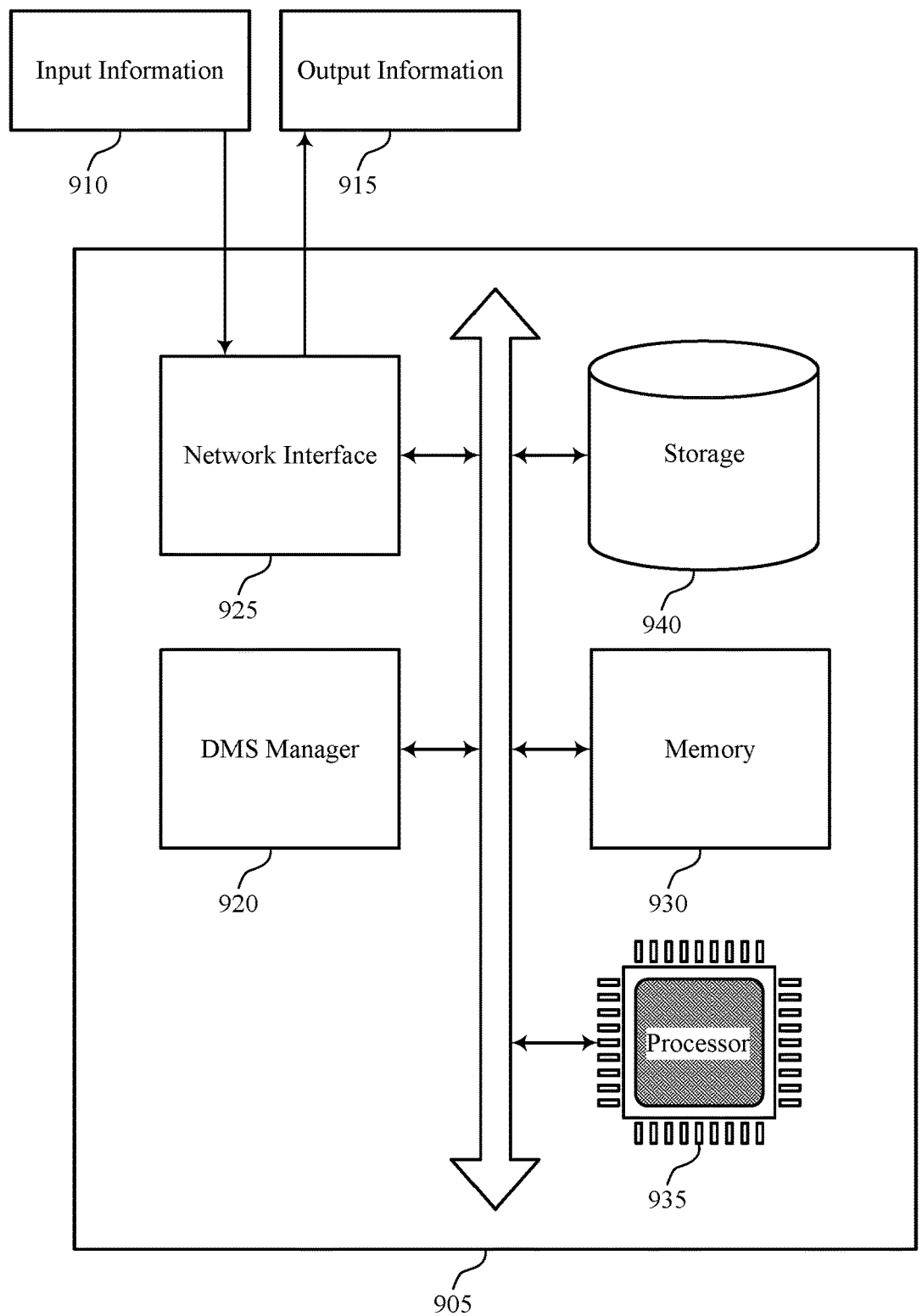
FIG. 9 shows a diagram of a system including a device that supports backup management of non-relational databases in accordance with aspects of the present disclosure.

FIG. 9 shows a block diagram 900 of a system 905 that supports backup management of non-relational databases in accordance with aspects of the present disclosure. The system 905 may be an example of or include components of a system 705 as described herein. The system 905 may include components for data management, including components such as a DMS manager 920, an input information 910, an output information 915, a network interface 925, at least one memory 930, at least one processor 935, and a storage 940. These components may be in electronic communication or otherwise coupled with each other (e.g., operatively, communicatively, functionally, electronically, electrically; via one or more buses, communications links, communications interfaces, or any combination thereof). Additionally, the components of the system 905 may include corresponding physical components or may be implemented as corresponding virtual components (e.g., components of one or more virtual machines). In some examples, the system 905 may be an example of aspects of one or more components described with reference to FIG. 1, such as a DMS 110.

The network interface 925 may enable the system 905 to exchange information (e.g., input information 910, output information 915, or both) with other systems or devices (not shown). For example, the network interface 925 may enable the system 905 to connect to a network (e.g., a network 120 as described herein). The network interface 925 may include one or more wireless network interfaces, one or more wired network interfaces, or any combination thereof. In some examples, the network interface 925 may be an example of may be an example of aspects of one or more components described with reference to FIG. 1, such as one or more network interfaces 165.

Memory 930 may include RAM, ROM, or both. The memory 930 may store computer-readable, computer-executable software including instructions that, when executed, cause the processor 935 to perform various functions described herein. In some cases, the memory 930 may contain, among other things, a basic input/output system (BIOS), which may control basic hardware or software operation such as the interaction with peripheral components or devices. In some cases, the memory 930 may be an example of aspects of one or more components described with reference to FIG. 1, such as one or more memories 175.

The processor 935 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 935 may be configured to execute computer-readable instructions stored in a memory 930 to perform various functions (e.g., functions or tasks supporting backup management of non-relational databases). Though a single processor 935 is depicted in the example of FIG. 9, it is to be understood that the system 905 may include any quantity of one or more of processors 935 and that a group of processors 935 may collectively perform one or more functions ascribed herein to a processor, such as the processor 935. In some cases, the processor 935 may be an example of aspects of one or more components described with reference to FIG. 1, such as one or more processors 170.

Storage 940 may be configured to store data that is generated, processed, stored, or otherwise used by the system 905. In some cases, the storage 940 may include one or more HDDs, one or more SDDs, or both. In some examples, the storage 940 may be an example of a single database, a distributed database, multiple distributed databases, a data store, a data lake, or an emergency backup database. In some examples, the storage 940 may be an example of one or more components described with reference to FIG. 1, such as one or more network disks 180.

The DMS manager 920 may support data management in accordance with examples as disclosed herein. For example, the DMS manager 920 may be configured as or otherwise support a means for obtaining, by a DMS configured to manage backup operations for a non-relational database, an indication to capture a snapshot of the non-relational database from a host of the non-relational database. The DMS manager 920 may be configured as or otherwise support a means for causing, by the DMS, performance by an agent of the DMS at the host of one or more iterations of a backup process until the snapshot is captured. In some examples, to perform an iteration of the backup process, the DMS manager 920 may be configured as or otherwise support a means for retrieving, based on a presence of uncaptured data in the non-relational database, a buffer at the agent from an empty buffer queue for the agent, writing, based on the buffer being retrieved, data from the non-relational database into the buffer until the buffer is full, where the data includes at least a portion of the uncaptured data, transitioning, based at least in part upon filling of the buffer with the data, the buffer to a full buffer queue for the agent, moving, based on the buffer being transitioned to the full buffer queue, the data from the buffer to a remote storage environment accessible to the DMS, and transitioning, based on completion of moving the data to the remote storage environment, the buffer from the full buffer queue to the empty buffer queue.

By including or configuring the DMS manager 920 in accordance with examples as described herein, the system 905 may support techniques for backup management of non-relational databases, which may provide one or more benefits such as, for example, reduced latency, improved user experience, more efficient utilization of computing resources, network resources or both, or improved scalability, among other possibilities.

Figure 10:
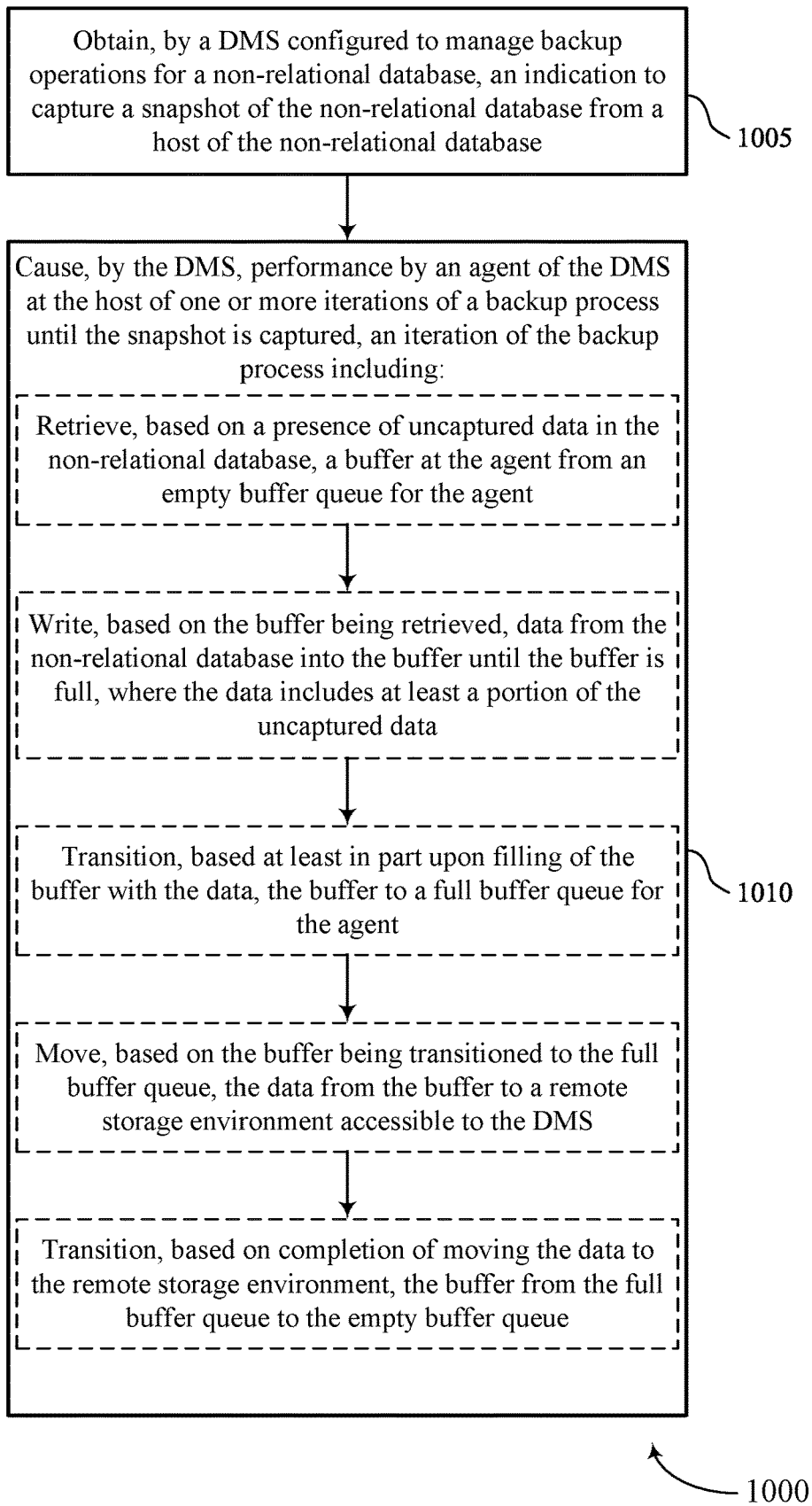
FIGS. 10 through 12 show flowcharts illustrating methods that support backup management of non-relational databases in accordance with aspects of the present disclosure.

FIG. 10 shows a flowchart illustrating a method 1000 that supports backup management of non-relational databases in accordance with aspects of the present disclosure. The operations of the method 1000 may be implemented by a DMS or its components as described herein. For example, the operations of the method 1000 may be performed by a DMS as described with reference to FIGS. 1 through 9. In some examples, a DMS may execute a set of instructions to control the functional elements of the DMS to perform the described functions. Additionally, or alternatively, the DMS may perform aspects of the described functions using special-purpose hardware.

At 1005, the method may include obtaining, by a DMS configured to manage backup operations for a non-relational database, an indication to capture a snapshot of the non-relational database from a host of the non-relational database. The operations of 1005 may be performed in accordance with examples as disclosed herein. In some examples, aspects of the operations of 1005 may be performed by a snapshot scheduling manager 825 as described with reference to FIG. 8.

At 1010, the method may include causing, by the DMS, performance by an agent of the DMS at the host of one or more iterations of a backup process until the snapshot is captured. In some examples, an iteration of the backup process may include retrieving, based on a presence of uncaptured data in the non-relational database, a buffer at the agent from an empty buffer queue for the agent, writing, based on the buffer being retrieved, data from the non-relational database into the buffer until the buffer is full, where the data includes at least a portion of the uncaptured data, transitioning, based at least in part upon filling of the buffer with the data, the buffer to a full buffer queue for the agent, moving, based on the buffer being transitioned to the full buffer queue, the data from the buffer to a remote storage environment accessible to the DMS, and transitioning, based on completion of moving the data to the remote storage environment, the buffer from the full buffer queue to the empty buffer queue. The operations of 1010 may be performed in accordance with examples as disclosed herein. In some examples, aspects of the operations of 1010 may be performed by a backup process iteration manager 830 as described with reference to FIG. 8.

Figure 11:
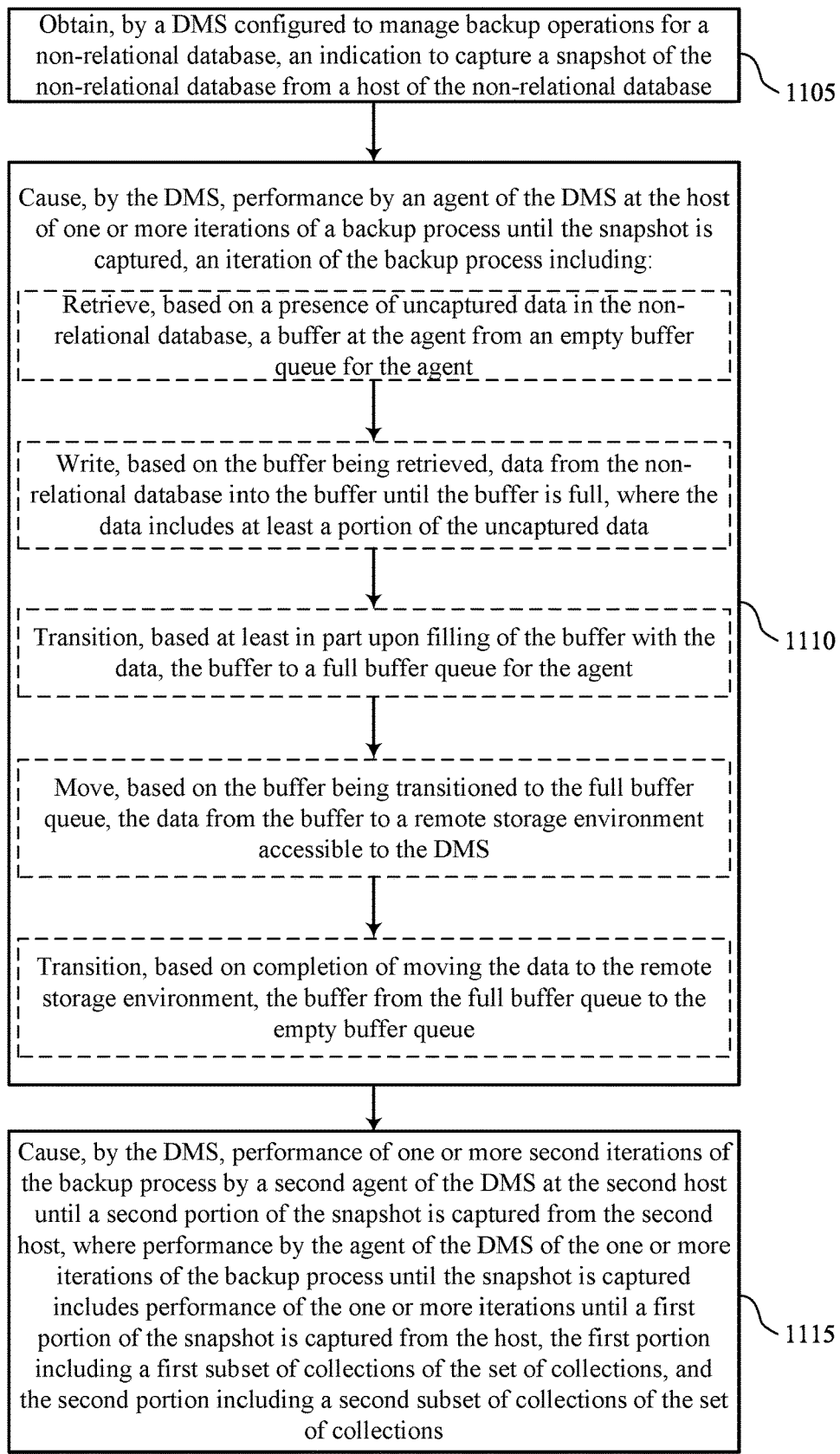

FIG. 11 shows a flowchart illustrating a method 1100 that supports backup management of non-relational databases in accordance with aspects of the present disclosure. The operations of the method 1100 may be implemented by a DMS or its components as described herein. For example, the operations of the method 1100 may be performed by a DMS as described with reference to FIGS. 1 through 9. In some examples, a DMS may execute a set of instructions to control the functional elements of the DMS to perform the described functions. Additionally, or alternatively, the DMS may perform aspects of the described functions using special-purpose hardware.

At 1105, the method may include obtaining, by a DMS configured to manage backup operations for a non-relational database, an indication to capture a snapshot of the non-relational database from a host of the non-relational database. The operations of 1105 may be performed in accordance with examples as disclosed herein. In some examples, aspects of the operations of 1105 may be performed by a snapshot scheduling manager 825 as described with reference to FIG. 8.

At 1110, the method may include causing, by the DMS, performance by an agent of the DMS at the host of one or more iterations of a backup process until the snapshot is captured. In some examples, an iteration of the backup process may include retrieving, based on a presence of uncaptured data in the non-relational database, a buffer at the agent from an empty buffer queue for the agent, writing, based on the buffer being retrieved, data from the non-relational database into the buffer until the buffer is full, where the data includes at least a portion of the uncaptured data, transitioning, based at least in part upon filling of the buffer with the data, the buffer to a full buffer queue for the agent, moving, based on the buffer being transitioned to the full buffer queue, the data from the buffer to a remote storage environment accessible to the DMS, and transitioning, based on completion of moving the data to the remote storage environment, the buffer from the full buffer queue to the empty buffer queue. The operations of 1110 may be performed in accordance with examples as disclosed herein. In some examples, aspects of the operations of 1110 may be performed by a backup process iteration manager 830 as described with reference to FIG. 8.

At 1115, the snapshot is associated with a set of collections of data that are stored at both the host and a second host of the non-relational database, and the method may include causing, by the DMS, performance of one or more second iterations of the backup process by a second agent of the DMS at the second host until a second portion of the snapshot is captured from the second host, where performance by the agent of the DMS of the one or more iterations of the backup process until the snapshot is captured includes performance of the one or more iterations until a first portion of the snapshot is captured from the host, the first portion including a first subset of collections of the set of collections, and the second portion including a second subset of collections of the set of collections. The operations of 1115 may be performed in accordance with examples as disclosed herein. In some examples, aspects of the operations of 1115 may be performed by a backup process iteration manager 830 as described with reference to FIG. 8.

Figure 12:
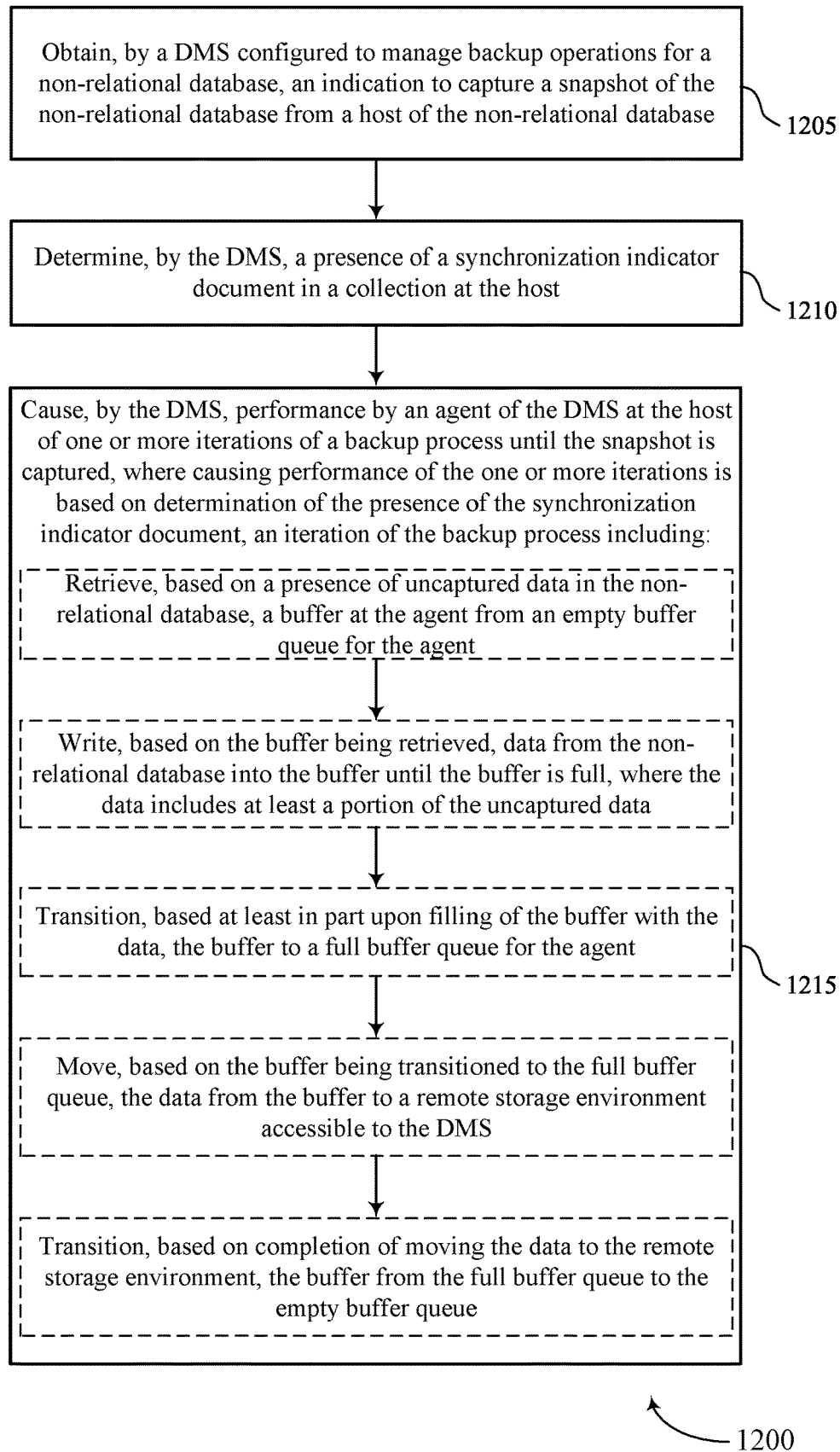

FIG. 12 shows a flowchart illustrating a method 1200 that supports backup management of non-relational databases in accordance with aspects of the present disclosure. The operations of the method 1200 may be implemented by a DMS or its components as described herein. For example, the operations of the method 1200 may be performed by a DMS as described with reference to FIGS. 1 through 9. In some examples, a DMS may execute a set of instructions to control the functional elements of the DMS to perform the described functions. Additionally, or alternatively, the DMS may perform aspects of the described functions using special-purpose hardware.

At 1205, the method may include obtaining, by a DMS configured to manage backup operations for a non-relational database, an indication to capture a snapshot of the non-relational database from a host of the non-relational database. The operations of 1205 may be performed in accordance with examples as disclosed herein. In some examples, aspects of the operations of 1205 may be performed by a snapshot scheduling manager 825 as described with reference to FIG. 8.

At 1210, the method may include determining, by the DMS, a presence of a synchronization indicator document in a collection at the host. The operations of 1210 may be performed in accordance with examples as disclosed herein. In some examples, aspects of the operations of 1210 may be performed by a synchronization indicator manager 835 as described with reference to FIG. 8.

At 1215, the method may include causing, by the DMS, performance by an agent of the DMS at the host of one or more iterations of a backup process until the snapshot is captured, where causing performance of the one or more iterations is based on determination of the presence of the synchronization indicator document. In some examples, an iteration of the backup process may include retrieving, based on a presence of uncaptured data in the non-relational database, a buffer at the agent from an empty buffer queue for the agent, writing, based on the buffer being retrieved, data from the non-relational database into the buffer until the buffer is full, where the data includes at least a portion of the uncaptured data, transitioning, based at least in part upon filling of the buffer with the data, the buffer to a full buffer queue for the agent, moving, based on the buffer being transitioned to the full buffer queue, the data from the buffer to a remote storage environment accessible to the DMS, and transitioning, based on completion of moving the data to the remote storage environment, the buffer from the full buffer queue to the empty buffer queue. The operations of 1215 may be performed in accordance with examples as disclosed herein. In some examples, aspects of the operations of 1215 may be performed by a backup process iteration manager 830 as described with reference to FIG. 8.

A method for data management by an apparatus is described. The method may include obtaining, by a DMS configured to manage backup operations for a non-relational database, an indication to capture a snapshot of the non-relational database from a host of the non-relational database and causing, by the DMS, performance by an agent of the DMS at the host of one or more iterations of a backup process until the snapshot is captured, where an iteration of the backup process includes retrieving, based on a presence of uncaptured data in the non-relational database, a buffer at the agent from an empty buffer queue for the agent, writing, based on the buffer being retrieved, data from the non-relational database into the buffer until the buffer is full, where the data includes at least a portion of the uncaptured data, transitioning, based at least in part upon filling of the buffer with the data, the buffer to a full buffer queue for the agent, moving, based on the buffer being transitioned to the full buffer queue, the data from the buffer to a remote storage environment accessible to the DMS, and transitioning, based on completion of moving the data to the remote storage environment, the buffer from the full buffer queue to the empty buffer queue.

An apparatus for data management is described. The apparatus may include one or more memories storing processor executable code, and one or more processors coupled with the one or more memories. The one or more processors may individually or collectively be operable to execute the code to cause the apparatus to obtain, by a DMS configured to manage backup operations for a non-relational database, an indication to capture a snapshot of the non-relational database from a host of the non-relational database and cause, by the DMS, performance by an agent of the DMS at the host of one or more iterations of a backup process until the snapshot is captured, where, to perform an iteration of the backup process, the one or more processors are individually or collectively operable to execute the code to cause the apparatus to retrieve, based on a presence of uncaptured data in the non-relational database, a buffer at the agent from an empty buffer queue for the agent, write, based on the buffer being retrieved, data from the non-relational database into the buffer until the buffer is full, where the data includes at least a portion of the uncaptured data, transition, based at least in part upon filling of the buffer with the data, the buffer to a full buffer queue for the agent, move, based on the buffer being transitioned to the full buffer queue, the data from the buffer to a remote storage environment accessible to the DMS, and transition, based on completion of moving the data to the remote storage environment, the buffer from the full buffer queue to the empty buffer queue.

Another apparatus for data management is described. The apparatus may include means for obtaining, by a DMS configured to manage backup operations for a non-relational database, an indication to capture a snapshot of the non-relational database from a host of the non-relational database and means for causing, by the DMS, performance by an agent of the DMS at the host of one or more iterations of a backup process until the snapshot is captured, where the means for an iteration of the backup process include means for retrieving, based on a presence of uncaptured data in the non-relational database, a buffer at the agent from an empty buffer queue for the agent, means for writing, based on the buffer being retrieved, data from the non-relational database into the buffer until the buffer is full, where the data includes at least a portion of the uncaptured data, means for transitioning, based at least in part upon filling of the buffer with the data, the buffer to a full buffer queue for the agent, means for moving, based on the buffer being transitioned to the full buffer queue, the data from the buffer to a remote storage environment accessible to the DMS, and means for transitioning, based on completion of moving the data to the remote storage environment, the buffer from the full buffer queue to the empty buffer queue.

A non-transitory computer-readable medium storing code for data management is described. The code may include instructions executable by one or more processors to obtain, by a DMS configured to manage backup operations for a non-relational database, an indication to capture a snapshot of the non-relational database from a host of the non-relational database and cause, by the DMS, performance by an agent of the DMS at the host of one or more iterations of a backup process until the snapshot is captured, where the instructions to perform an iteration of the backup process are executable to retrieve, based on a presence of uncaptured data in the non-relational database, a buffer at the agent from an empty buffer queue for the agent, write, based on the buffer being retrieved, data from the non-relational database into the buffer until the buffer is full, where the data includes at least a portion of the uncaptured data, transition, based at least in part upon filling of the buffer with the data, the buffer to a full buffer queue for the agent, move, based on the buffer being transitioned to the full buffer queue, the data from the buffer to a remote storage environment accessible to the DMS, and transition, based on completion of moving the data to the remote storage environment, the buffer from the full buffer queue to the empty buffer queue.

In some examples of the method, apparatus, and non-transitory computer-readable medium described herein, the snapshot may be associated with a set of collections of data that may be stored at both the host and a second host of the non-relational database and the method, apparatuses, and non-transitory computer-readable medium may include further operations, features, means, or instructions for causing, by the DMS, performance of one or more second iterations of the backup process by a second agent of the DMS at the second host until a second portion of the snapshot may be captured from the second host, where performance by the agent of the DMS of the one or more iterations of the backup process until the snapshot may be captured includes performance of the one or more iterations until a first portion of the snapshot may be captured from the host, the first portion including a first subset of collections of the set of collections, and the second portion including a second subset of collections of the set of collections.

In some examples of the method, apparatus, and non-transitory computer-readable medium described herein, the one or more iterations and the one or more second iterations may be performed in parallel.

In some examples of the method, apparatus, and non-transitory computer-readable medium described herein, the set of collections of data may be also stored at a third host of the non-relational database and the method, apparatuses, and non-transitory computer-readable medium may include further operations, features, means, or instructions for causing, by the DMS, performance of one or more third iterations of the backup process by a third agent of the DMS at the third host until a third portion of the snapshot may be captured from the second host, where the third portion includes a third subset of collections of the set of collections.

In some examples of the method, apparatus, and non-transitory computer-readable medium described herein, the host may be a primary host of the non-relational database and the second host and the third host may be secondary hosts of the non-relational database that may be configured to store respective copies of the non-relational database from the host.

Some examples of the method, apparatus, and non-transitory computer-readable medium described herein may further include operations, features, means, or instructions for determining, by the DMS, a presence of a synchronization indicator document in a collection at the host, where causing performance of the one or more iterations may be based on determination of the presence of the synchronization indicator document.

Some examples of the method, apparatus, and non-transitory computer-readable medium described herein may further include operations, features, means, or instructions for causing insertion, by the DMS and prior to the determination of the presence of the synchronization indicator document in the collection at the host, of the synchronization indicator document into the collection at a second host of the non-relational database, where the second host and the host both store respective copies of the non-relational database.

Some examples of the method, apparatus, and non-transitory computer-readable medium described herein may further include operations, features, means, or instructions for determining whether a timestamp indicated by the synchronization indicator document may be later than a threshold time, where causing performance of the one or more iterations may be based on a determination that the timestamp may be later than the threshold time.

Some examples of the method, apparatus, and non-transitory computer-readable medium described herein may further include operations, features, means, or instructions for causing initiation, by the DMS and based on the indication to capture the snapshot, of an extractor job and a mover job for a first collection from a set of collections of data associated with the snapshot. The extractor job may perform, for the first collection and as part of the one or more iterations of the backup process: the retrieving the buffer from the empty buffer queue; the writing the data from the non-relational database into the buffer; and the transitioning the buffer to the full buffer queue. The mover job may perform, for the first collection and as part of the one or more iterations of the backup process: the moving the data from the buffer to the remote storage environment; and the transitioning the buffer from the full buffer queue to the empty buffer queue.

Some examples of the method, apparatus, and non-transitory computer-readable medium described herein may further include operations, features, means, or instructions for causing initiation, by the DMS and based on the indication to capture the snapshot, of a second extractor job and a second mover job for a second collection from the set of collections and causing, by the DMS, performance by the agent of the DMS one or more second iterations of the backup process, where a second iteration of the one or more second iterations includes: retrieving, by the second extractor job and based a presence of second uncaptured data in the second collection, a second buffer at the agent from a second empty buffer queue for the agent; writing, by the second extractor job and based on the second buffer being retrieved, second data from the second collection into the second buffer until the second buffer is full, where the second data comprises at least a second portion of the second uncaptured data; transitioning, by the second extractor job and based upon filling of the second buffer with the second data, the second buffer to a second full buffer queue for the agent; moving, by the second mover job and based on the second buffer being transitioned to the second full buffer queue, the second data from the second buffer to the remote storage environment; and transitioning, by the second mover job and based on completion of moving the second data to the remote storage environment, the second buffer from the second full buffer queue to the second empty buffer queue.

Some examples of the method, apparatus, and non-transitory computer-readable medium described herein may further include operations, features, means, or instructions for selecting the buffer from the empty buffer queue by the extractor job may be based on the presence of the uncaptured data in the first collection.

In some examples of the method, apparatus, and non-transitory computer-readable medium described herein, the one or more iterations of the backup process for the first collection and the one or more second iterations of the backup process for the second collection may be performed in parallel.

Some examples of the method, apparatus, and non-transitory computer-readable medium described herein may further include operations, features, means, or instructions for updating, by the DMS, the snapshot based on one or more change log files that indicate one or more changes to the non-relational database during a time period in which the one or more iterations may be performed.

Some examples of the method, apparatus, and non-transitory computer-readable medium described herein may further include operations, features, means, or instructions for performing, by the DMS, an application programming interface call to the host and receiving, by the DMS from the host in response to the application programming interface call, an indication that the host may be configured to capture change log files for the non-relational database, where causing performance of the one or more iterations may be based on reception of the indication that the host may be configured to capture the change log files.

In some examples of the method, apparatus, and non-transitory computer-readable medium described herein, writing data from the non-relational database into the buffer may include operations, features, means, or instructions for writing one or more documents into the buffer.

In some examples of the method, apparatus, and non-transitory computer-readable medium described herein, obtaining the indication to capture the snapshot may include operations, features, means, or instructions for determining, by the DMS, that a time period since a last snapshot of the non-relational database satisfies a threshold time period.

In some examples of the method, apparatus, and non-transitory computer-readable medium described herein, obtaining the indication to capture the snapshot may include operations, features, means, or instructions for receiving the indication to capture the snapshot from a computing device associated with an administrative account associated with the non-relational database.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for data management, comprising:
   obtaining, by a data management system (DMS) configured to manage backup operations for a non-relational database, an indication to capture a snapshot of the non-relational database from a host of the non-relational database; and
   causing, by the DMS, performance by an agent of the DMS at the host of one or more iterations of a backup process until the snapshot is captured, wherein an iteration of the backup process comprises:
      retrieving, based at least in part on a presence of uncaptured data in the non-relational database, a buffer at the agent from an empty buffer queue for the agent;
      writing, based at least in part on the buffer being retrieved, data from the non-relational database into the buffer until the buffer is full, wherein the data comprises at least a portion of the uncaptured data;
      transitioning, based at least in part upon filling of the buffer with the data, the buffer to a full buffer queue for the agent;
      moving, based at least in part on the buffer being transitioned to the full buffer queue, the data from the buffer to a remote storage environment accessible to the DMS; and
      transitioning, based at least in part on completion of moving the data to the remote storage environment, the buffer from the full buffer queue to the empty buffer queue.

2. The method of claim 1, wherein the snapshot is associated with a set of collections of data that are stored at both the host and a second host of the non-relational database, the method further comprising:
   causing, by the DMS, performance of one or more second iterations of the backup process by a second agent of the DMS at the second host until a second portion of the snapshot is captured from the second host,
   wherein performance by the agent of the DMS of the one or more iterations of the backup process until the snapshot is captured comprises performance of the one or more iterations until a first portion of the snapshot is captured from the host, the first portion comprising a first subset of collections of the set of collections, and the second portion comprising a second subset of collections of the set of collections.

3. The method of claim 2, wherein the one or more iterations and the one or more second iterations are performed in parallel.

4. The method of claim 2, wherein the set of collections of data is also stored at a third host of the non-relational database, the method further comprising:
causing, by the DMS, performance of one or more third iterations of the backup process by a third agent of the DMS at the third host until a third portion of the snapshot is captured from the second host, wherein the third portion comprises a third subset of collections of the set of collections.

5. The method of claim 4, wherein:
the host is a primary host of the non-relational database, and
the second host and the third host are secondary hosts of the non-relational database that are configured to store respective copies of the non-relational database from the host.

6. The method of claim 1, further comprising:
determining, by the DMS, a presence of a synchronization indicator document in a collection at the host, wherein causing performance of the one or more iterations is based at least in part on determination of the presence of the synchronization indicator document.

7. The method of claim 6, further comprising:
causing insertion, by the DMS and prior to the determination of the presence of the synchronization indicator document in the collection at the host, of the synchronization indicator document into the collection at a second host of the non-relational database, wherein the second host and the host both store respective copies of the non-relational database.

8. The method of claim 6, further comprising:
determining whether a timestamp indicated by the synchronization indicator document is later than a threshold time, wherein causing performance of the one or more iterations is based at least in part on a determination that the timestamp is later than the threshold time.

9. The method of claim 1, further comprising:
causing initiation, by the DMS and based at least in part on the indication to capture the snapshot, of an extractor job and a mover job for a first collection from a set of collections of data associated with the snapshot,
wherein the extractor job performs, for the first collection and as part of the one or more iterations of the backup process, the retrieving the buffer from the empty buffer queue, the writing the data from the non-relational database into the buffer, and the transitioning the buffer to the full buffer queue, and
wherein the mover job performs, for the first collection and as part of the one or more iterations of the backup process, the moving the data from the buffer to the remote storage environment and the transitioning the buffer from the full buffer queue to the empty buffer queue.

10. The method of claim 9, further comprising:
causing initiation, by the DMS and based at least in part on the indication to capture the snapshot, of a second extractor job and a second mover job for a second collection from the set of collections; and
causing, by the DMS, performance by the agent of the DMS one or more second iterations of the backup process, wherein a second iteration of the one or more second iterations comprises:
retrieving, by the second extractor job and based at least in part on a presence of second uncaptured data in the second collection, a second buffer at the agent from a second empty buffer queue for the agent;
writing, by the second extractor job and based at least in part on the second buffer being retrieved, second data from the second collection into the second buffer until the second buffer is full, wherein the second data comprises at least a second portion of the second uncaptured data;
transitioning, by the second extractor job and based at least in part upon filling of the second buffer with the second data, the second buffer to a second full buffer queue for the agent;
moving, by the second mover job and based at least in part on the second buffer being transitioned to the second full buffer queue, the second data from the second buffer to the remote storage environment; and
transitioning, by the second mover job and based at least in part on completion of moving the second data to the remote storage environment, the second buffer from the second full buffer queue to the second empty buffer queue.

11. The method of claim 10, wherein selecting the buffer from the empty buffer queue by the extractor job is based at least in part on the presence of the uncaptured data in the first collection.

12. The method of claim 10, wherein the one or more iterations of the backup process for the first collection and the one or more second iterations of the backup process for the second collection are performed in parallel.

13. The method of claim 1, further comprising:
updating, by the DMS, the snapshot based at least in part on one or more change log files that indicate one or more changes to the non-relational database during a time period in which the one or more iterations are performed.

14. The method of claim 13, further comprising:
performing, by the DMS, an application programming interface call to the host; and
receiving, by the DMS from the host in response to the application programming interface call, an indication that the host is configured to capture change log files for the non-relational database, wherein causing performance of the one or more iterations is based at least in part on reception of the indication that the host is configured to capture the change log files.

15. The method of claim 1, wherein writing data from the non-relational database into the buffer comprises:
writing one or more documents into the buffer.

16. The method of claim 1, wherein obtaining the indication to capture the snapshot comprises:
determining, by the DMS, that a time period since a last snapshot of the non-relational database satisfies a threshold time period.

17. The method of claim 1, wherein obtaining the indication to capture the snapshot comprises:
receiving the indication to capture the snapshot from a computing device associated with an administrative account associated with the non-relational database.

18. An apparatus for data management, comprising:
one or more memories storing processor-executable code; and one or more processors coupled with the one or more memories and individually or collectively operable to execute the code to cause the apparatus to:

obtain, by a data management system (DMS) configured to manage backup operations for a non-relational database, an indication to capture a snapshot of the non-relational database from a host of the non-relational database; and cause, by the DMS, performance by an agent of the DMS at the host of one or more iterations of a backup process until the snapshot is captured, wherein, to perform an iteration of the backup process, the one or more processors are individually or collectively operable to execute the code to cause the apparatus to:

retrieve, based at least in part on a presence of uncaptured data in the non-relational database, a buffer at the agent from an empty buffer queue for the agent;

write, based at least in part on the buffer being retrieved, data from the non-relational database into the buffer until the buffer is full, wherein the data comprises at least a portion of the uncaptured data;

transition, based at least in part upon filling of the buffer with the data, the buffer to a full buffer queue for the agent;

move, based at least in part on the buffer being transitioned to the full buffer queue, the data from the buffer to a remote storage environment accessible to the DMS; and transition, based at least in part on completion of moving the data to the remote storage environment, the buffer from the full buffer queue to the empty buffer queue.

19. The apparatus of claim 18, wherein the snapshot is associated with a set of collections of data that are stored at both the host and a second host of the non-relational database, and wherein the one or more processors are individually or collectively further operable to execute the code to cause the apparatus to:

cause, by the DMS, performance of one or more second iterations of the backup process by a second agent of the DMS at the second host until a second portion of the snapshot is captured from the second host, wherein performance by the agent of the DMS of the one or more iterations of the backup process until the snapshot is captured comprises performance of the one or more iterations until a first portion of the snapshot is captured from the host, the first portion comprising a first subset of collections of the set of collections, and the second portion comprising a second subset of collections of the set of collections.

20. A non-transitory computer-readable medium storing code for data management, the code comprising instructions executable by one or more processors to:

obtain, by a data management system (DMS) configured to manage backup operations for a non-relational database, an indication to capture a snapshot of the non-relational database from a host of the non-relational database; and cause, by the DMS, performance by an agent of the DMS at the host of one or more iterations of a backup process until the snapshot is captured, wherein, to perform an iteration of the backup process, the instructions are executable by the one or more processors to:

retrieve, based at least in part on a presence of uncaptured data in the non-relational database, a buffer at the agent from an empty buffer queue for the agent;

write, based at least in part on the buffer being retrieved, data from the non-relational database into the buffer until the buffer is full, wherein the data comprises at least a portion of the uncaptured data;

transition, based at least in part upon filling of the buffer with the data, the buffer to a full buffer queue for the agent;

move, based at least in part on the buffer being transitioned to the full buffer queue, the data from the buffer to a remote storage environment accessible to the DMS; and transition, based at least in part on completion of moving the data to the remote storage environment, the buffer from the full buffer queue to the empty buffer queue.

* * * * *